United States Patent
Dotz et al.

(10) Patent No.: US 12,191,729 B2
(45) Date of Patent: Jan. 7, 2025

(54) STATOR FOR AN ELECTRIC MACHINE, AND ELECTRIC MACHINE

(71) Applicant: Valeo Siemens eAutomotive Germany GmbH, Erlangen (DE)

(72) Inventors: Boris Dotz, Bad Neustadt a.d.Saale (DE); Christian Finger-Albert, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 250 days.

(21) Appl. No.: 17/922,014

(22) PCT Filed: Mar. 26, 2021

(86) PCT No.: PCT/EP2021/057991
§ 371 (c)(1),
(2) Date: Oct. 28, 2022

(87) PCT Pub. No.: WO2021/219306
PCT Pub. Date: Nov. 4, 2021

(65) Prior Publication Data
US 2023/0179052 A1    Jun. 8, 2023

(30) Foreign Application Priority Data

Apr. 30, 2020   (DE) .................... 10 2020 111 826.0

(51) Int. Cl.
| | |
|---|---|
| *H02K 3/28* | (2006.01) |
| *H02K 3/12* | (2006.01) |
| *H02K 15/06* | (2006.01) |

(52) U.S. Cl.
CPC ................. *H02K 3/28* (2013.01); *H02K 3/12* (2013.01); *H02K 15/064* (2013.01)

(58) Field of Classification Search
CPC .......... H02K 3/28; H02K 3/12; H02K 15/064; H02K 2213/03
See application file for complete search history.

(56) References Cited

U.S. PATENT DOCUMENTS

| | | | |
|---|---|---|---|
| 6,995,492 B1* | 2/2006 | Kouda ..................... | H02K 3/28 310/201 |
| 9,455,605 B2* | 9/2016 | Saito ....................... | B60L 58/10 |

(Continued)

FOREIGN PATENT DOCUMENTS

| | | |
|---|---|---|
| DE | 102019122550 A1 | 2/2020 |
| EP | 3029810 A2 | 6/2016 |

(Continued)

OTHER PUBLICATIONS

Office Action issued in counterpart Japanese Patent Application No. JP 2022-566292 A mailed Dec. 5, 2023 (4 pages).

(Continued)

*Primary Examiner* — Burton S Mullins
(74) *Attorney, Agent, or Firm* — Osha Bergman Watanabe & Burton LLP

(57) ABSTRACT

A stator (1) for an electric machine (101), wherein
the stator (1) has N≥3 phases (U, V, W), P≥2 pole pairs, and q≥1 holes,
the stator (1) comprises a stator core (3) having at least 2NPq slots (4) and a number of 2NPqL shaped conductors (5) arranged in an even number of L≥4 layers (6*a-h*) radially layered in the slots (4),
the shaped conductors (5) form 2q paths (7*a-d*) per phase and are arranged in 2P winding zones (8), which each extend radially over L layers (6*a-h*) and in the circumferential direction over at least q directly adjacent slots (4), (Continued)

Figure 1:
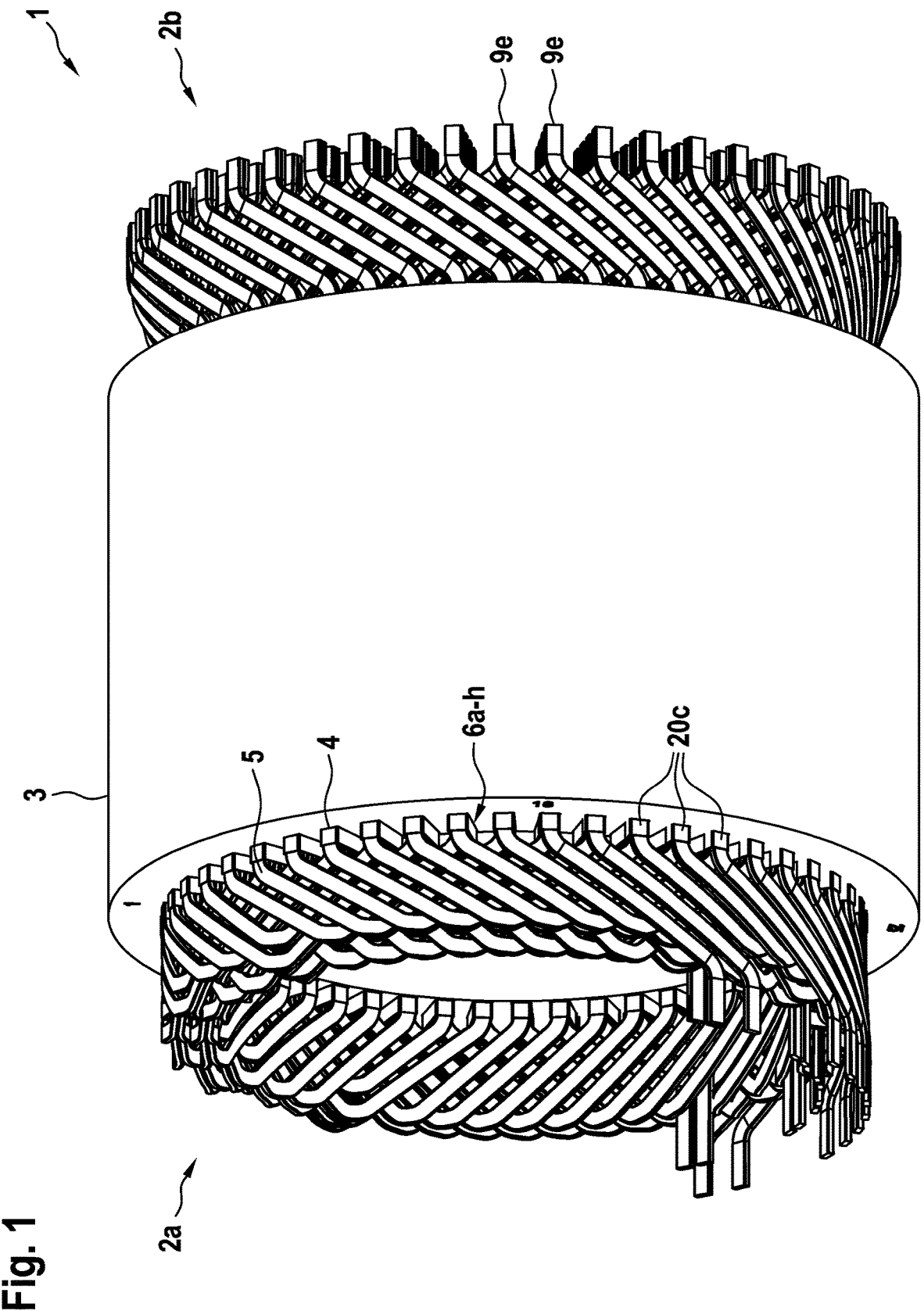

the shaped conductors (5) of each path are connected in a series circuit, which is provided by connectors (9a-e, 10a-f, 11a-g) arranged at both end faces (2a, 2b) of the stator core, each path comprises L/2 groups (12a-d) of shaped conductors (5) successively connected in series, each group (12a-d) is formed by at least one arrangement (13a, 13b) of at least four shaped conductors (5) which are arranged alternately in two immediately adjacent layers (6a-g) and are connected in series by first connectors (9a-e) which each provide an offset by qN slots (4) and an offset by one layer, and pairs of groups (12a-d) adjacent with respect to the series connection are each connected by a second connector (10a-f) which provides an offset by a plurality of slots (4) and an offset by two layers.

19 Claims, 23 Drawing Sheets

(56) References Cited

U.S. PATENT DOCUMENTS

| | | | |
|---|---|---|---|
| 9,906,085 | B2* | 2/2018 | Nakamura ............... H02K 1/16 |
| 2015/0244227 | A1 | 8/2015 | Wakimoto et al. |
| 2019/0027977 | A1 | 1/2019 | Saito et al. |

FOREIGN PATENT DOCUMENTS

| | | |
|---|---|---|
| JP | 4265973 B2 | 5/2009 |
| JP | 2009-131092 A | 6/2009 |
| JP | 2013-081356 A | 5/2013 |
| JP | 2017-184587 A | 10/2017 |
| JP | 2020-054052 A | 4/2020 |
| WO | 2017-149934 A1 | 9/2017 |
| WO | 2019-130747 A1 | 7/2019 |

OTHER PUBLICATIONS

International Preliminary Report on Patentability in corresponding International Application No. PCT/EP20201/057991, dated Apr. 30, 2020 (7 pages).

* cited by examiner

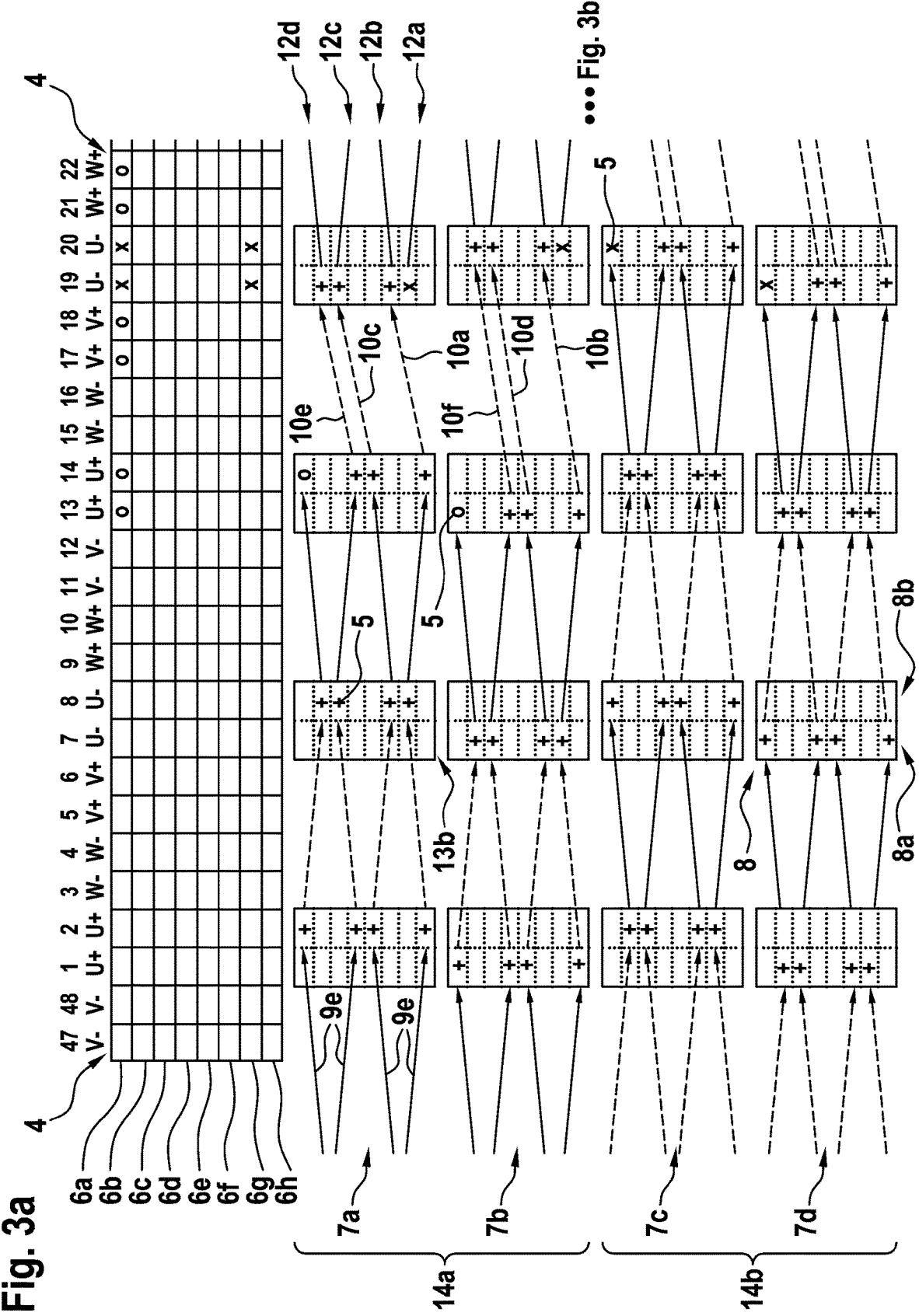

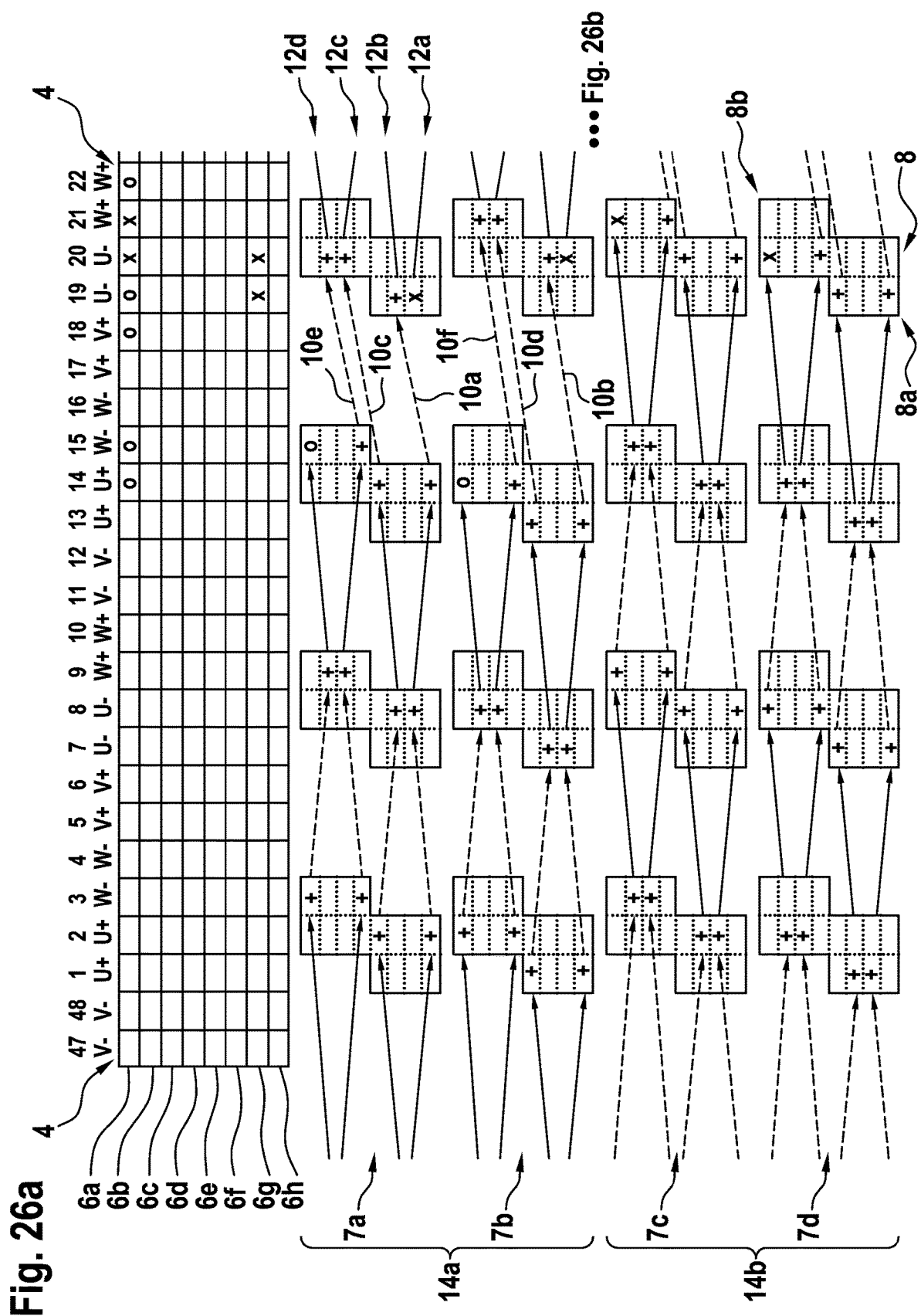

STATOR FOR AN ELECTRIC MACHINE, AND ELECTRIC MACHINE

The present invention relates to a stator for an electric machine. In addition, the invention relates to an electric machine.

Document US 2015/0 244 227 A1 discloses a stator having a stator core and a stator winding. The stator core has a plurality of circumferentially arranged slots. The stator winding is formed by a plurality of phase windings inserted into the slots and wound in the stator core. The stator core has n (n is a natural number and greater than or equal to 2) in-phase slots provided sequentially in the circumferential direction so as to correspond to magnetic poles of a rotor. Phase windings of the same phase are installed in each of the in-phase slots. Each of the phase windings is divided into 2n portions from one end positioned in a direction of extent to another end, so that each of the phase windings is formed by a first partial winding, a second partial winding, up to a 2n-th partial winding, these being positioned in series from one end in the direction of extent. The first partial winding and the 2n-th partial winding are arranged in different in-phase slots of the stator core.

In the case of such stators with stator windings formed from shaped conductors, the challenge, particularly with regard to automotive applications, is to provide the required number of winding paths that can be connected in parallel or in series while complying with symmetry requirements, to provide the smallest possible winding overhang in the axial direction, to provide simple connection options for the phases and to enable suitability for an automated manufacturing process with high process reliability. In addition, a high number of layers, in which the shaped conductors are arranged in radial layers, per slot is desired in order to use flat shaped conductors, which enables low losses at high frequencies.

The object of the invention is to provide a stator suitable for automotive applications that has multiple paths and a relatively high number of layers per slot.

According to the invention, this object is achieved by a stator for an electric machine, wherein the stator has a number N of phases, a number P of pole pairs, and a number q of holes, wherein $N \geq 3$ and $P \geq 2$ and $q \geq 1$, wherein the stator comprises a stator core with at least $2N \cdot P \cdot q$ slots and a number $2N \cdot P \cdot q \cdot L$ of shaped conductors, which are arranged in a number L of layers radially layered in the slots, wherein $L \geq 4$ and is even, wherein the shaped conductors form $2 \cdot q$ paths per phase which can be connected in series or in parallel with one another and are arranged in 2P winding zones each extending radially over L layers and circumferentially over at least q immediately adjacent slots, wherein the shaped conductors of each path are connected in a series circuit, which is provided by connectors arranged at both end faces of the stator core, wherein each path comprises $L/2$ groups of successively series-connected shaped conductors, wherein each group is formed by at least one arrangement of at least four shaped conductors arranged alternately in two immediately adjacent layers and by first connectors, which in each case provide an offset by $q \cdot N$ slots in the circumferential direction and an offset by one layer in the radial direction, wherein pairs of groups which are adjacent with respect to the series connection are each connected by a second connector which provides an offset by a plurality of slots in the circumferential direction and an offset by two layers in the radial direction.

The stator according to the invention is distinguished in that the shaped conductors of each group are arranged alternately in two directly adjacent layers and connected in series, so that a shaft winding is provided for each path of a phase. Particularly favorable symmetry properties result from the fact that the pairs of groups adjacent with respect to the series connection are each connected by a second connector, which provides an offset by a plurality of slots in the circumferential direction and an offset by two layers in the radial direction. This offset by two layers causes the shaped conductors of two groups adjacent with respect to the series connection to alternate in opposite directions in the layers. If, for example, a first shaped conductor of a first group with respect to the series connection is arranged radially further out than the next shaped conductor of this group, the first shaped conductor of the next group with respect to the series connection is arranged radially further in than the next shaped conductor of this group, since the last shaped conductor of the first group and the first shaped conductor of the next group are connected by a second connector, and so on.

This results in a particularly advantageous symmetrical arrangement of the groups. Automated production is facilitated in particular because only a small number of different types of second connectors are required to provide the winding structure of the stator according to the invention.

The shaped conductors are typically rod-shaped conductors, especially made of copper. The shaped conductors are typically not flexible. Typically, L-shaped conductors in L layers occupy at least 60%, preferably at least 80%, of the cross-sectional area of a slot. Typically, the shaped conductors have a rectangular cross-section, which may be rounded. Typically, each winding zone provides one pole of the stator. The number of holes q corresponds in particular to the number of directly adjacent slots assigned to a phase of the stator in a layer.

Typically, it is true that $N \leq 12$, preferably $N \leq 9$, particularly preferably $N \leq 6$. It may be provided that $P \leq 20$, preferably $P \leq 16$, particularly preferably $P \leq 12$. Typically, it is true that $q \leq 6$, preferably $q \leq 4$, particularly preferably $q \leq 3$. More appropriately, it is provided that $L \leq 16$, preferably $L \leq 12$, particularly preferably $L \leq 8$. The number of slots is preferably less than 200, particularly preferably less than 120.

In principle, it is expedient if the shaped conductors of each group occupy each winding zone once, so that a group forms a complete circumferential circuit. Preferably, with regard to the series connection, first shaped conductors of a group are arranged in the same winding zones and last shaped conductors are arranged in the same winding zones.

Although the stator according to the invention may well have a number of holes q=1, it is preferred if $q \geq 2$, in particular q=2. In this context, each winding zone typically has a first to q-th partial winding zone, wherein each partial winding zone extends over the L layers. The partial winding zones of a winding zone are typically directly adjacent in the circumferential direction.

According to a first preferred variant, each partial winding zone extends over exactly one slot. This allows a straight or full pitch stator to be provided.

Advantageously, it can be provided, that the second connectors, which connect groups of a path, provide the same offset by a plurality of slots. This can improve the symmetry properties with regard to a path.

In a preferred embodiment, it can be provided, that second connectors of at least one of the paths, in particular second connectors of q paths, provide an offset by $N \cdot q - 1$ slots. Alternatively or additionally, second connectors of at least one of the paths, in particular second connectors of q paths, provide an offset by $N \cdot q + 1$ slots. Thus, an alternation of the partial winding zones is provided by a second connector to improve the symmetry properties.

According to an alternative embodiment, with which advantageously a stator with a chorded winding can be provided, it is provided that each partial winding zone extends over at least two directly adjacent slots and has in the radial direction a number V of projections by one slot in each case, wherein V≥1. Typically, V≤6, preferably V≤3, particularly preferably V≤2. It is preferred if the offsets have the same orientation in the circumferential direction and/or occur after L/[V+1] layers in each case.

In order to provide a change of partial winding zones by the second connectors in a stator with a chorded winding, which improves the symmetry properties, it can be provided that second connectors of at least one of the paths provide an offset by N·q−1 slots and/or N·q−1 slots when they do not cover an offset in the radial direction. In order to provide the change in the case of a left-chorded stator, it is preferred that second connectors of at least one of the paths provide an offset by N·q−2 slots and/or N·q slots when they cover an offset in the radial direction. To provide the change in a right-chorded stator, it is preferred if second connectors of at least one of the paths provide an offset by N·q+2 slots and/or N·q slots when they cover an offset in the radial direction.

With particular advantage, in the case of the stator having a number of holes q≥2, it can be provided, that each group comprises q arrangements, each of which is arranged in a different one of the partial winding zones. It is particularly preferred if, with respect to the series connection, directly adjacent arrangements of a group are connected by a third connector which provides an offset by a number not equal to Nq slots in the circumferential direction and an offset by one layer in the radial direction. In this way, a change of the partial arrangement zone in adjacent arrangements is provided with simultaneous continuation of the shaft winding.

For reasons of symmetry, it is preferred here if the third connectors of a path provide the same offset in the circumferential direction.

In addition, it can be provided, that third connectors of at least one of the paths provide an offset by N·q+1 slots and/or third connectors of at least one of the paths provide an offset by N·q−1 slots.

A particularly low winding overhang can be achieved if third connectors of different paths, which connect third connectors between the same winding zones of shaped conductors in the same layers, are arranged in such a way that a third connector, which provides a smaller offset by the plurality of slots than another third connector, is arranged axially further inward than the other third connector.

In the stator according to the invention, a particularly small winding overhang can preferably be achieved if second connectors of different paths, which second connectors connect shaped conductors in the same layers between the same winding zones, are arranged in such a way that a second connector, which provides a smaller offset by the plurality of slots than another second connector, is arranged axially further inward than the other second connector.

In other words, the two second or third connectors are arranged one inside the other so that the axially available installation space is efficiently utilized. The second and third connectors can run parallel and/or equidistantly with respect to their positions in the radial direction and/or circumferential direction.

The reduction of the winding overhang is also beneficial if q sets of paths of the same size with respect to the series connection have the same sequence of connectors, each offset from the other by Nq slots. In this way, it can be achieved that second or third connectors of one set of the paths are not arranged at the same positions in the circumferential direction as second or third connectors of other sets of the paths.

Advantageously, it can also be provided with the stator according to the invention that the connectors arranged at one of the end faces of the stator core are each formed in one piece with the shaped conductors connected by them, and the connectors arranged at the other end face of the stator core are formed by the joining, preferably in an integrally bonded manner, of free ends of connecting elements which are formed in one piece with the shaped conductor and adjoin this shaped conductor. In this way, a hairpin winding can be provided which is particularly advantageous from the point of view of manufacturing technology. Corresponding arrangements comprising a connector, two shaped conductors and connecting elements are also known as "U-pins". Alternatively, it is also conceivable that the connectors and/or the connecting elements are not formed in one piece with the shaped conductors and are fastened to the shaped conductors, for example, by a fastening means such as screws or rivets.

Preferably, the first connectors of an arrangement are formed alternately on the one hand in one piece with the shaped conductors connected by them and on the other hand by the joining of the connecting elements. Preferably, all second and/or all third connectors are formed in one piece with the shaped conductors connected by them.

In this case, each connector arranged at the first end face preferably has two protruding portions extending in the axial direction and circumferential direction, in particular at an obtuse angle. Preferably, each protruding portion extends along a predefined radial position. The protruding portions can be connected by a transition portion, which forms the offset in the radial direction.

The connecting elements preferably each comprise a protruding portion extending in the axial direction and circumferential direction. The protruding portion can be adjoined by a joining portion extending in the axial direction, at which the connecting element is provided with the other connecting element forming the first connector at the other end face.

In an advantageous embodiment of the stator according to the invention, it can also be provided that each outer shaped conductor of a path, with respect to the series connection, has a free end projecting at one of the end faces of the stator core, and a connecting element adjoins the shaped conductor at the other end face, the free end of which connecting element is provided with the or a connecting element adjoining the second-outer shaped conductor of the path. The connecting elements can then be used particularly conveniently for connecting the paths.

According to a preferred embodiment of the stator according to the invention, the paths of each phase are connected to a star point of the phases. Alternatively, the paths of each phase can be connected to a plurality of, in particular two, star points of the phases.

Expediently, the stator further comprises a connection device connected to the outer shaped conductors with respect to the series connection and forming the phase connections and/or one or more star point connectors.

According to a preferred embodiment, the following apply: N=3 and P=4 and q=2 and L=8. Preferably, V=1. Typically, the number of slots is then 48.

The object forming the basis of the invention is further achieved in accordance with the invention by an electric machine comprising a stator according to the invention and a rotor rotatable arranged within the stator. The electric machine is preferably an electric motor. The electric machine is preferably a rotating electric machine. The electric machine is typically formed as a rotating field machine. In an advantageous embodiment, the electric machine is a synchronous machine, in particular a permanently excited synchronous machine, or an asynchronous machine.

The object forming the basis of the invention can further be achieved by a vehicle comprising an electric machine according to the invention, which is set up to drive the vehicle. The vehicle is preferably a partially or fully electrically driven vehicle, for example a hybrid vehicle or a battery electric vehicle (BEV).

Figure 2:
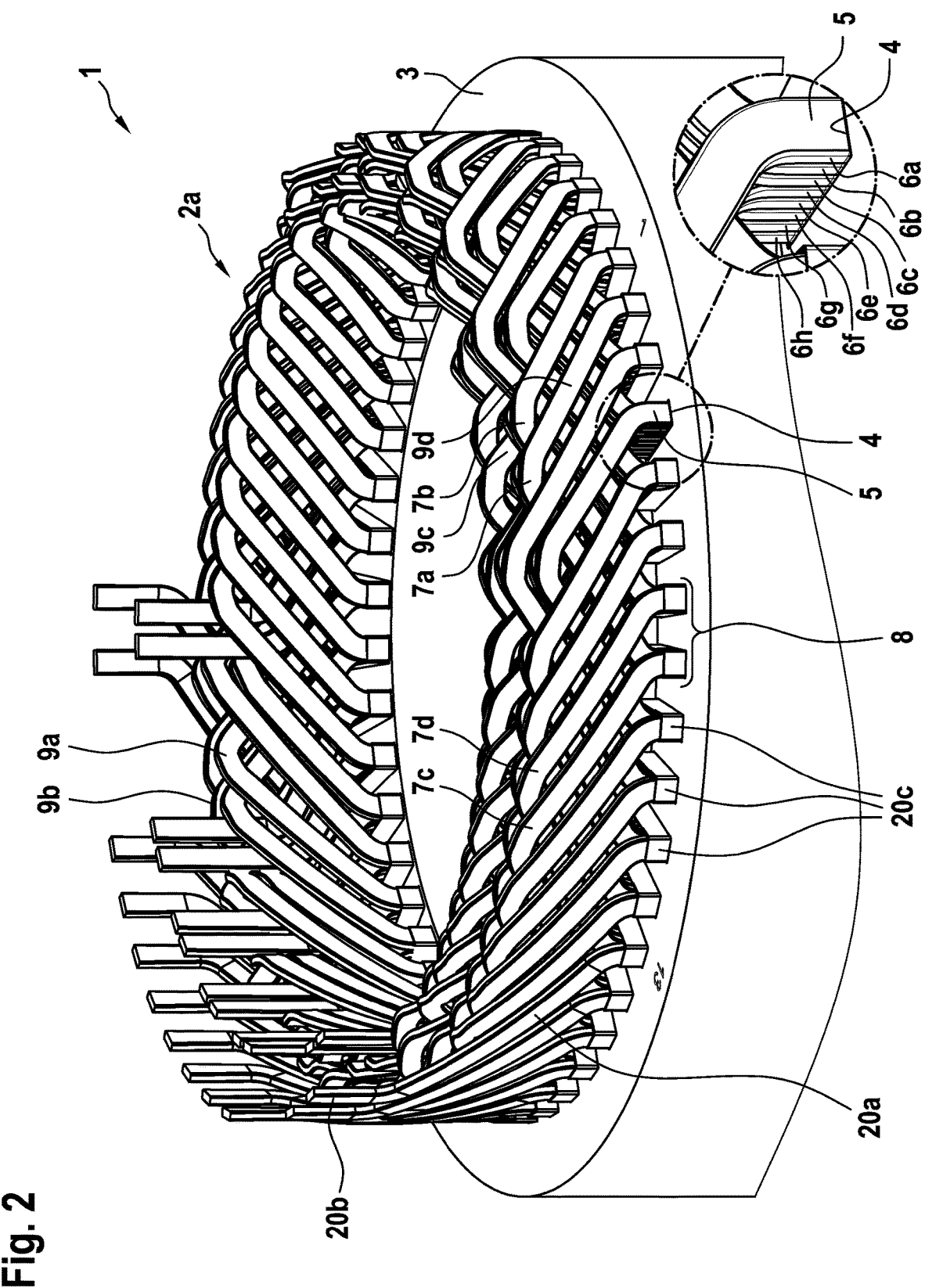
Figure 3B:
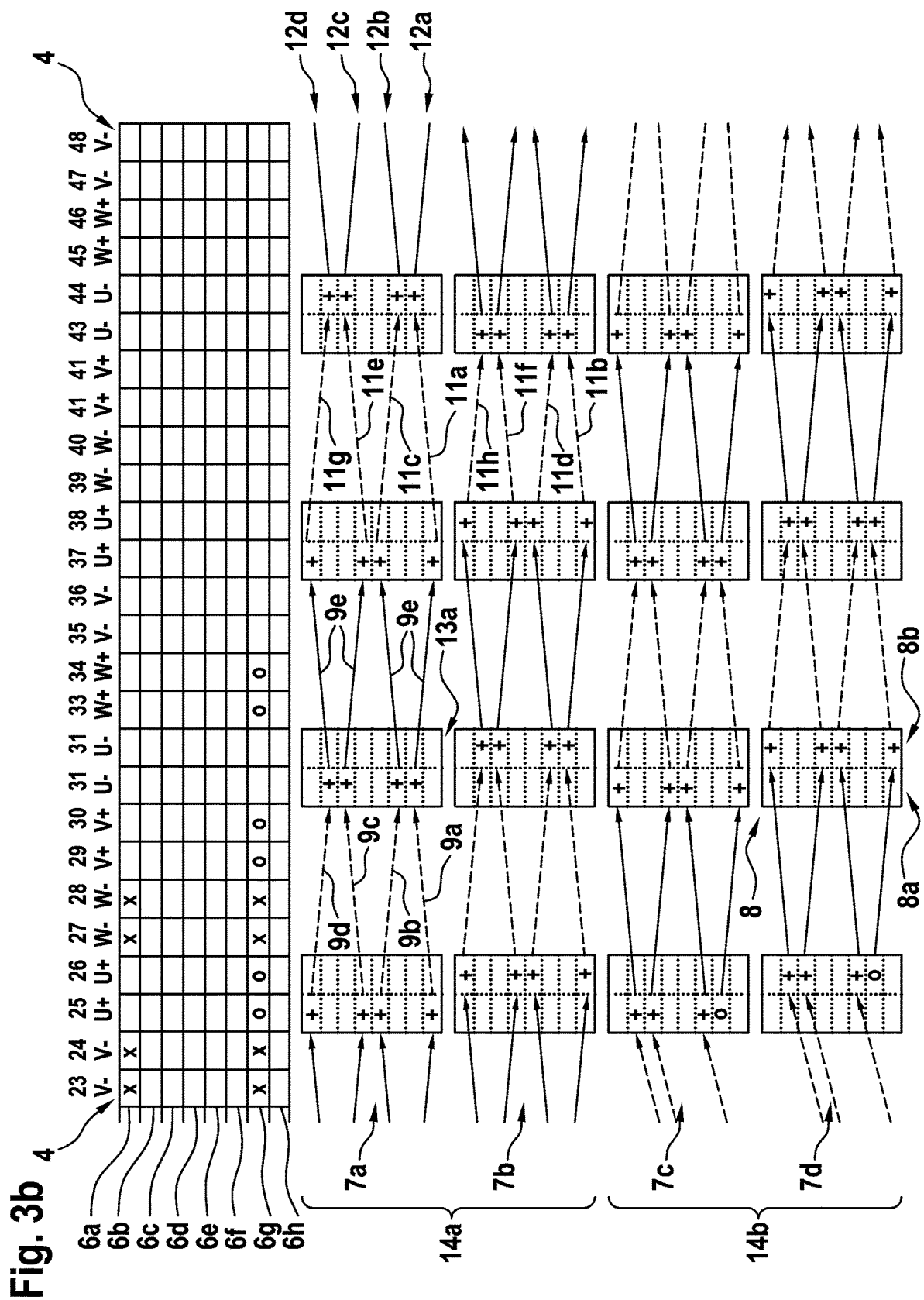
Figure 14:
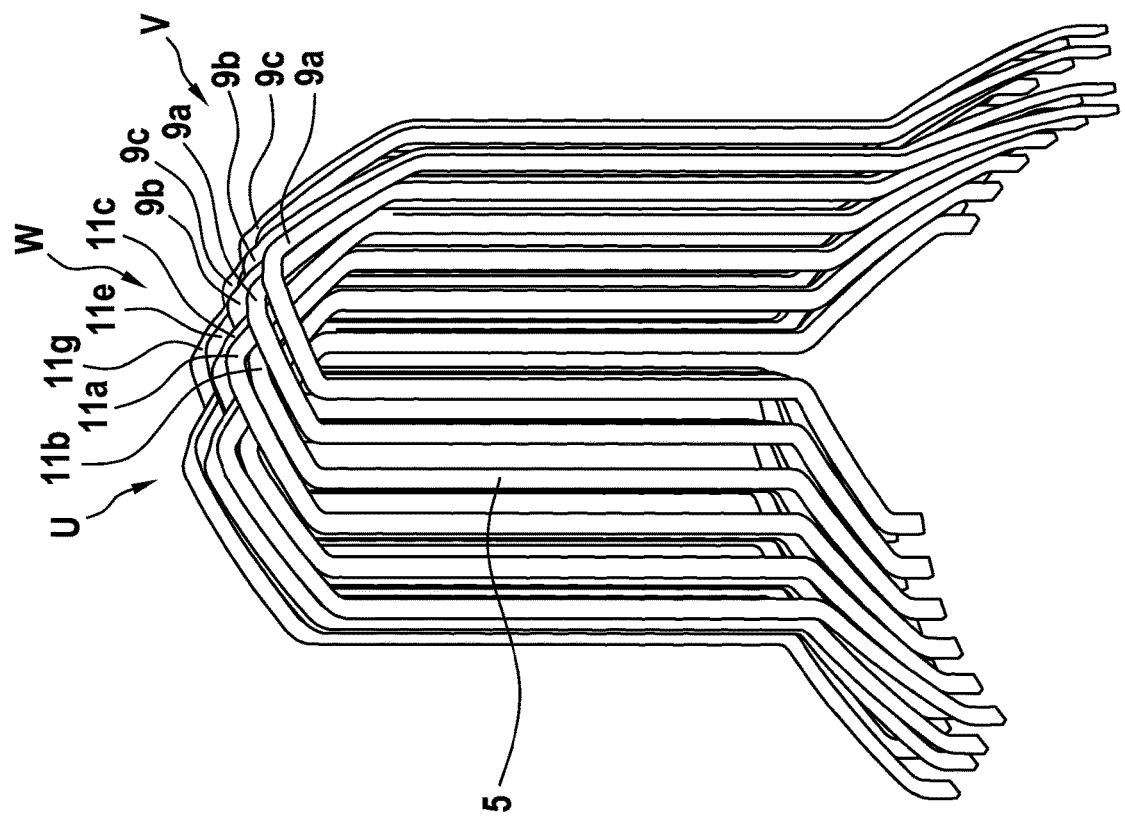
Figure 23:
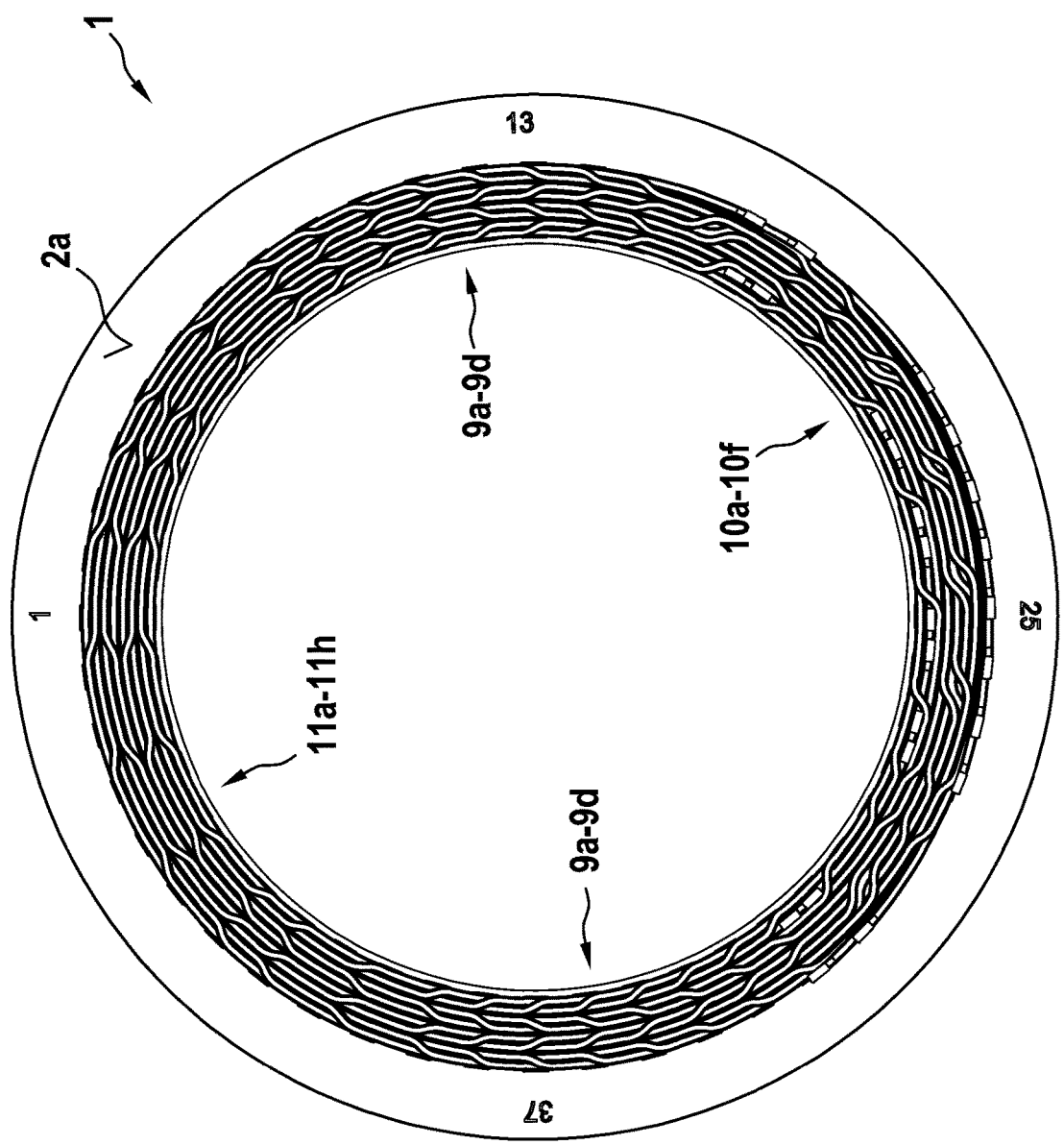
Figure 24A:
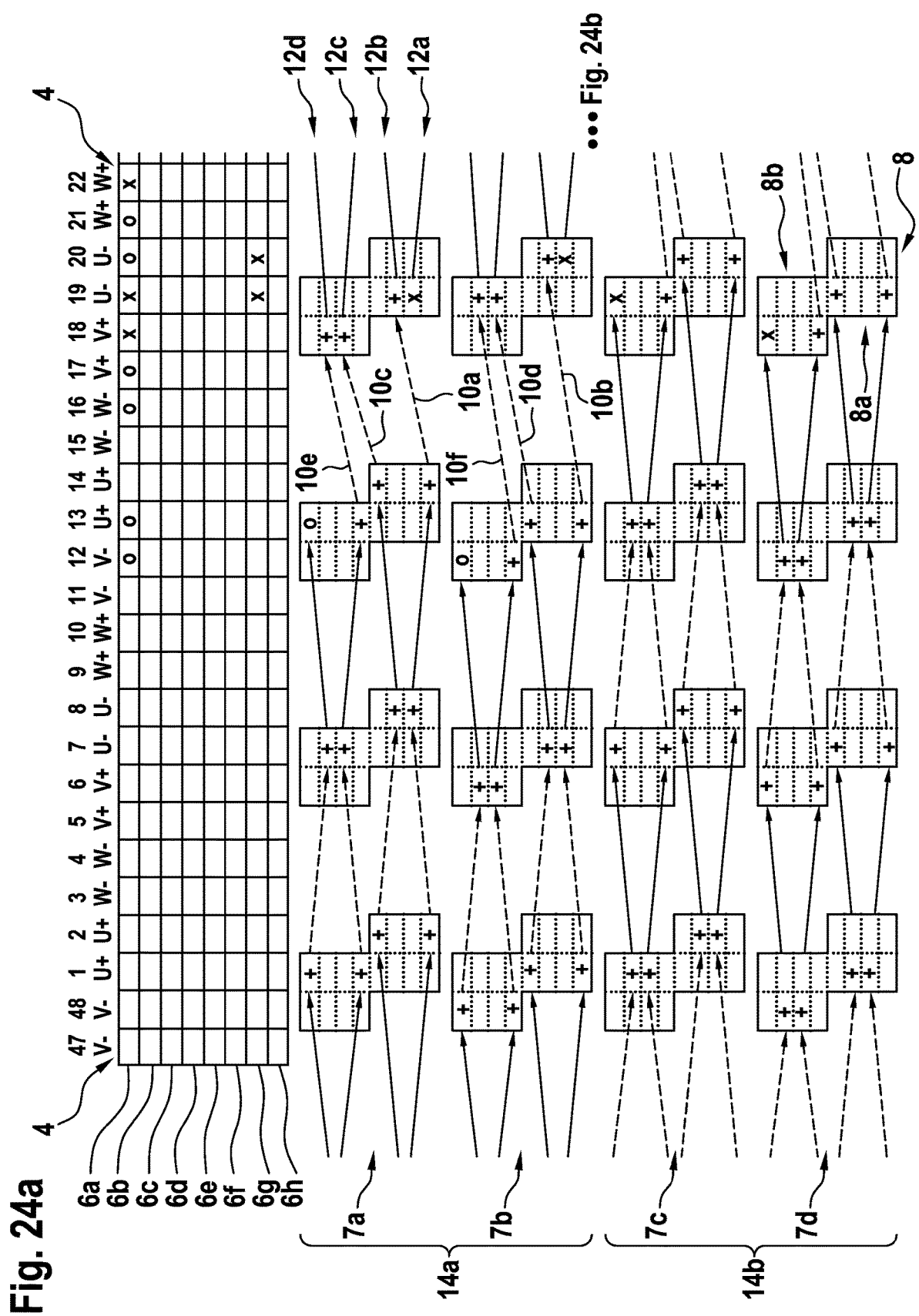
Figure 24B:
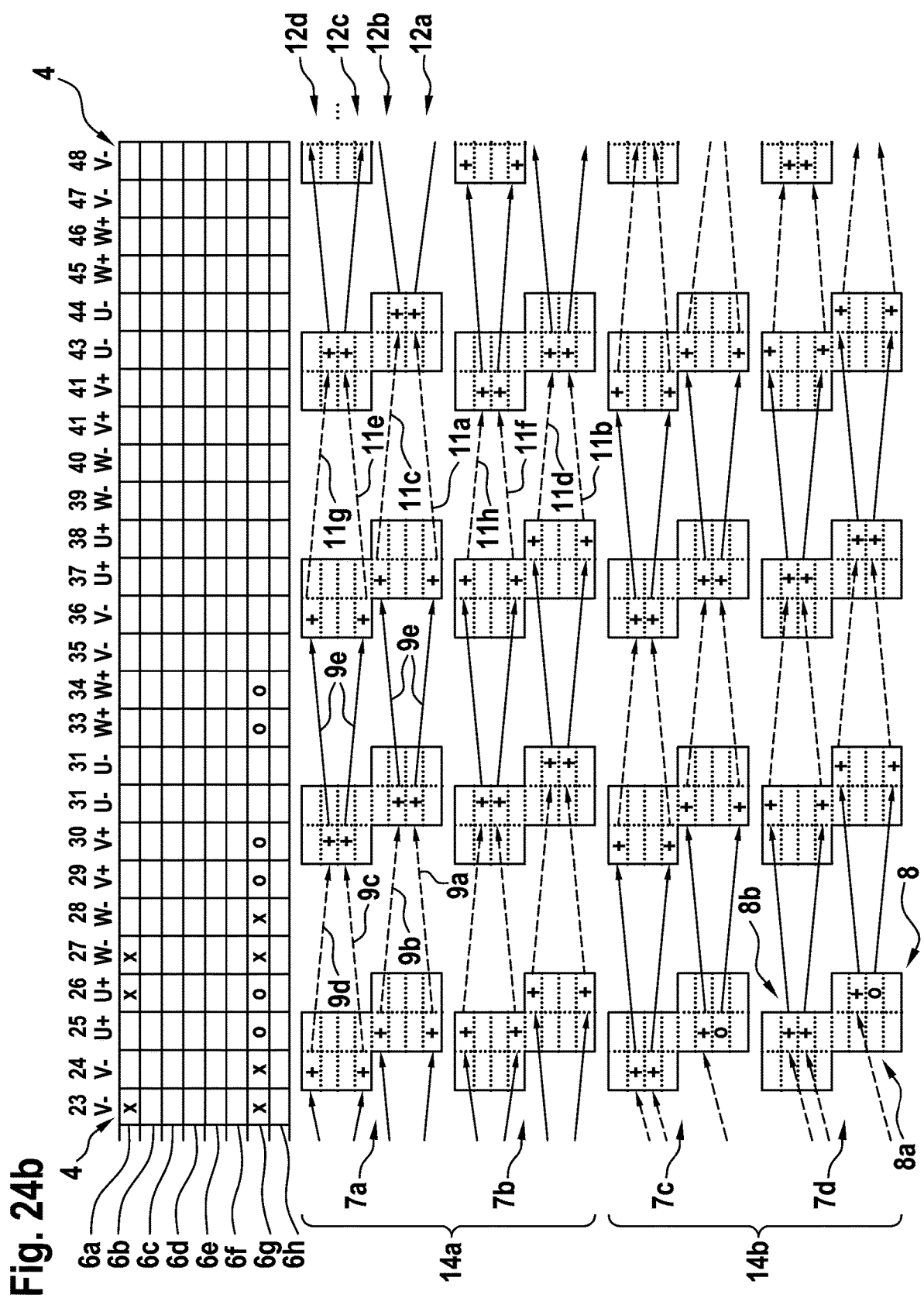
Figure 25:
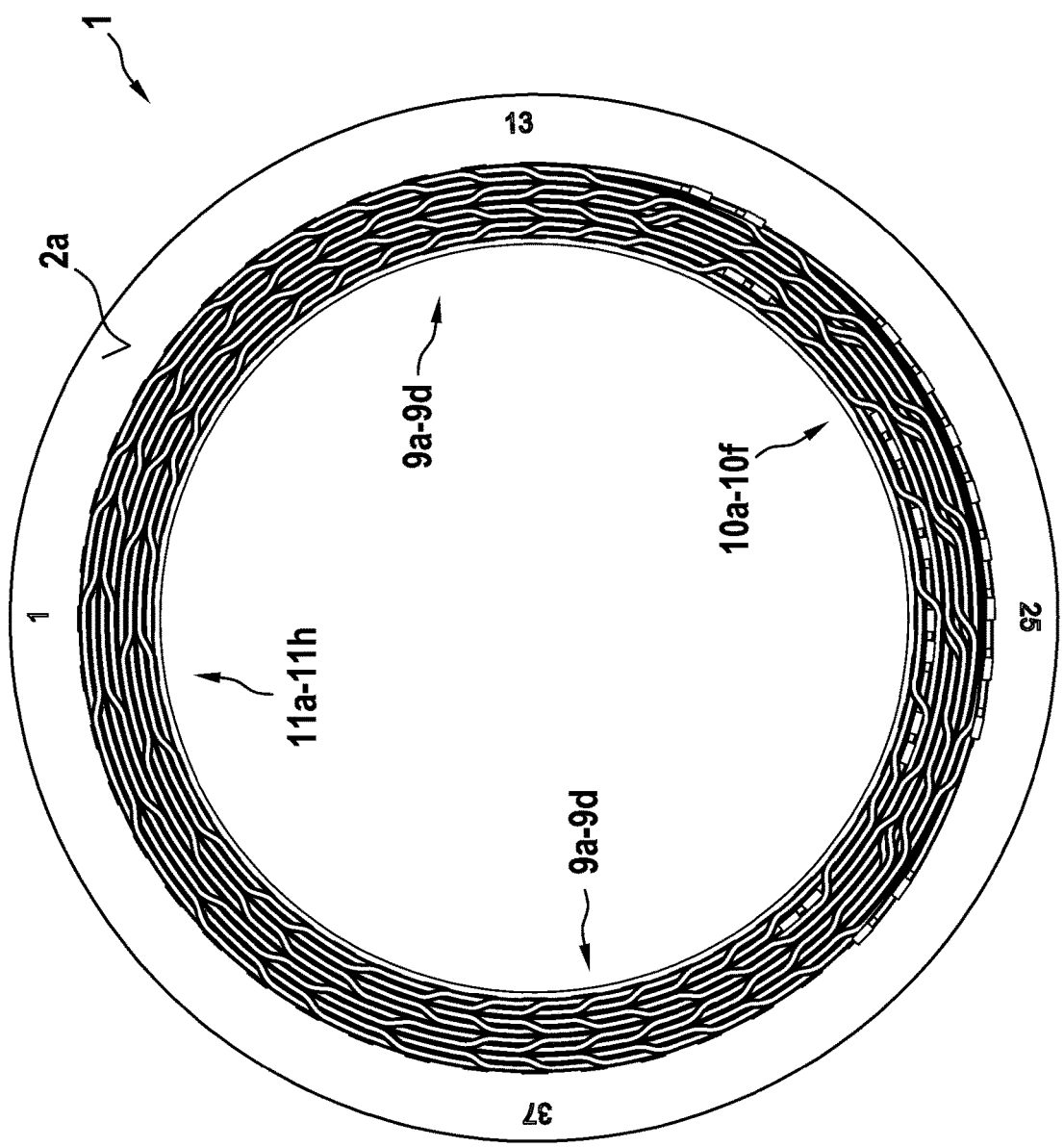
Figure 26B:
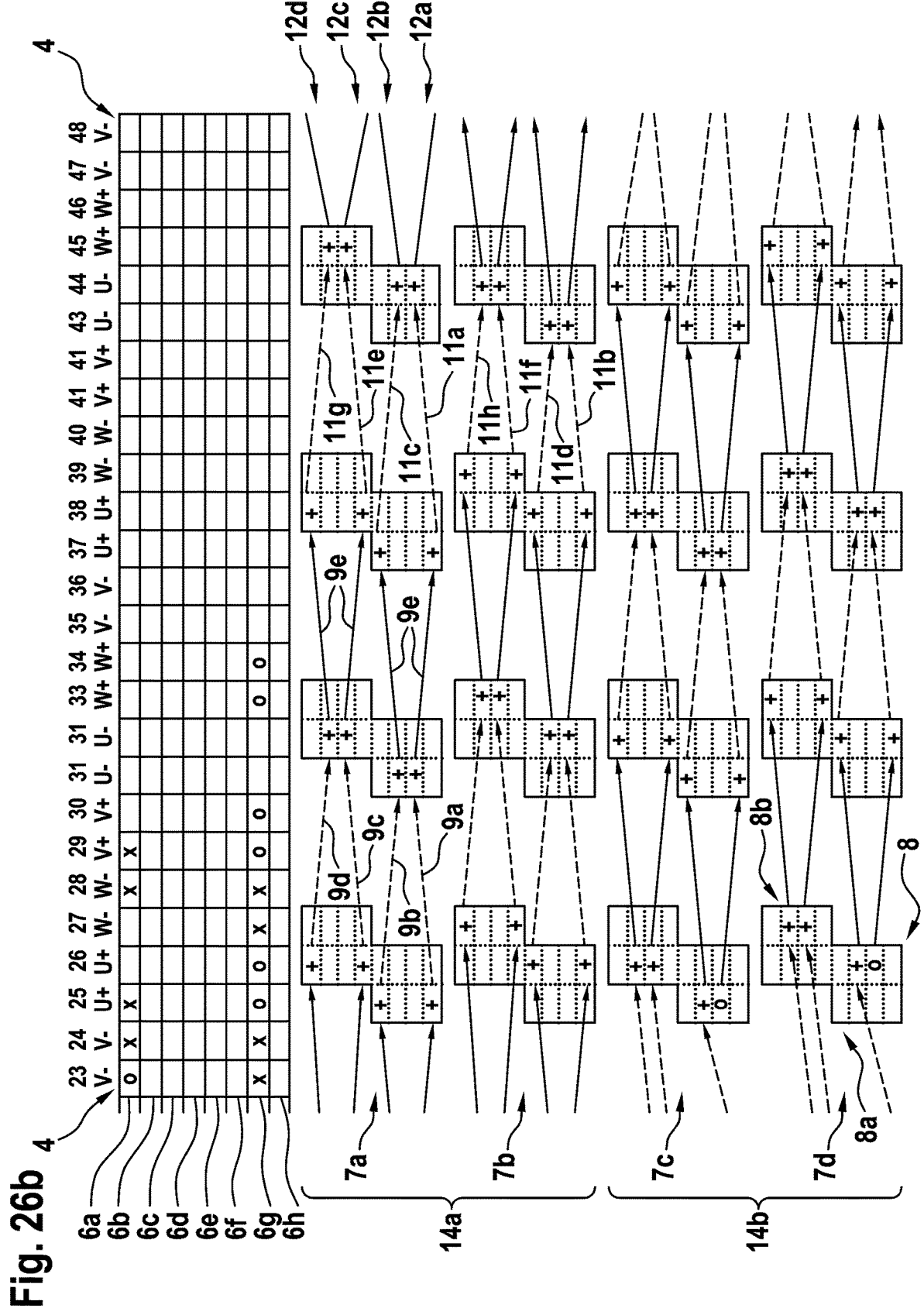
Figure 27:
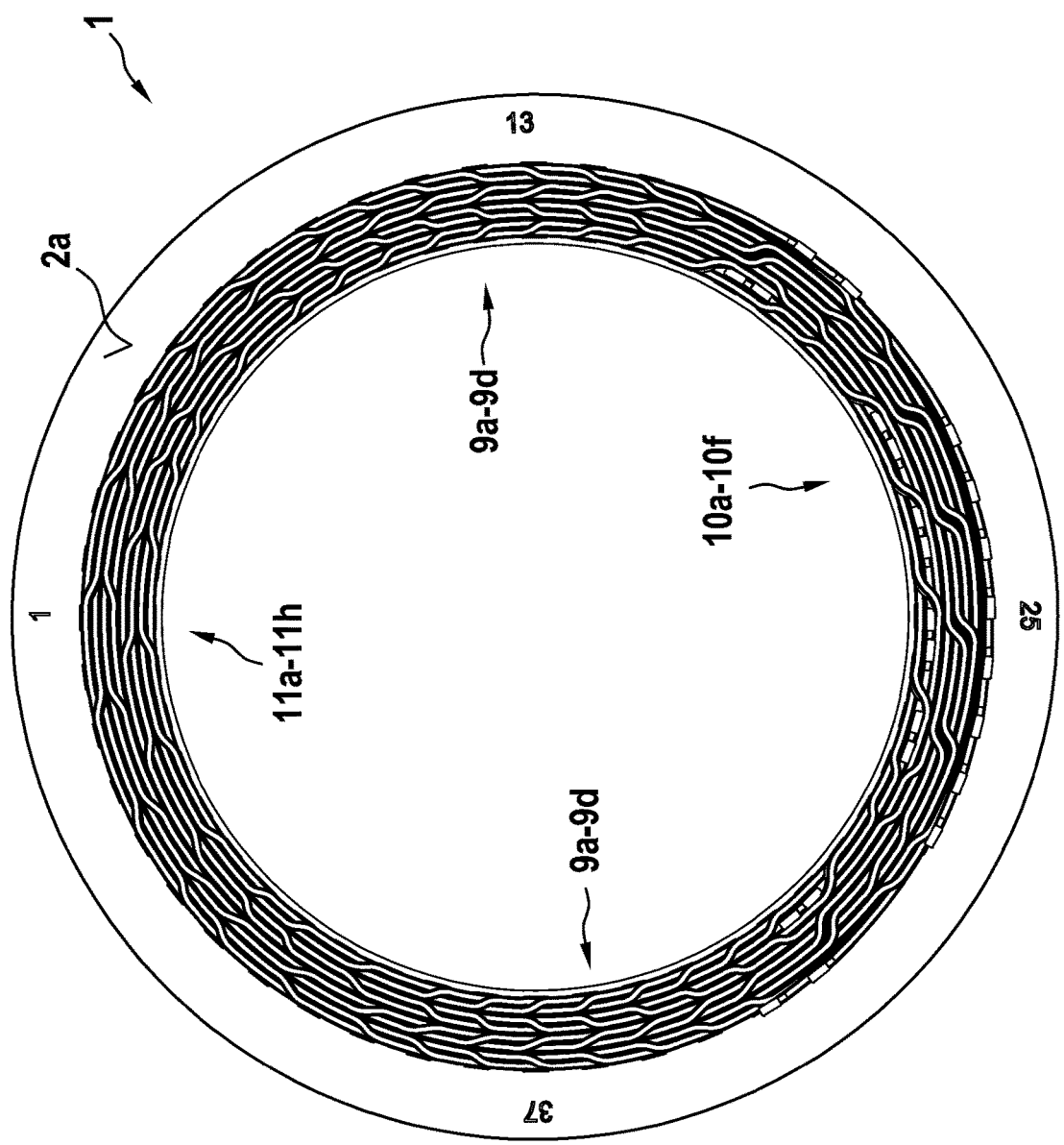
Figure 29:
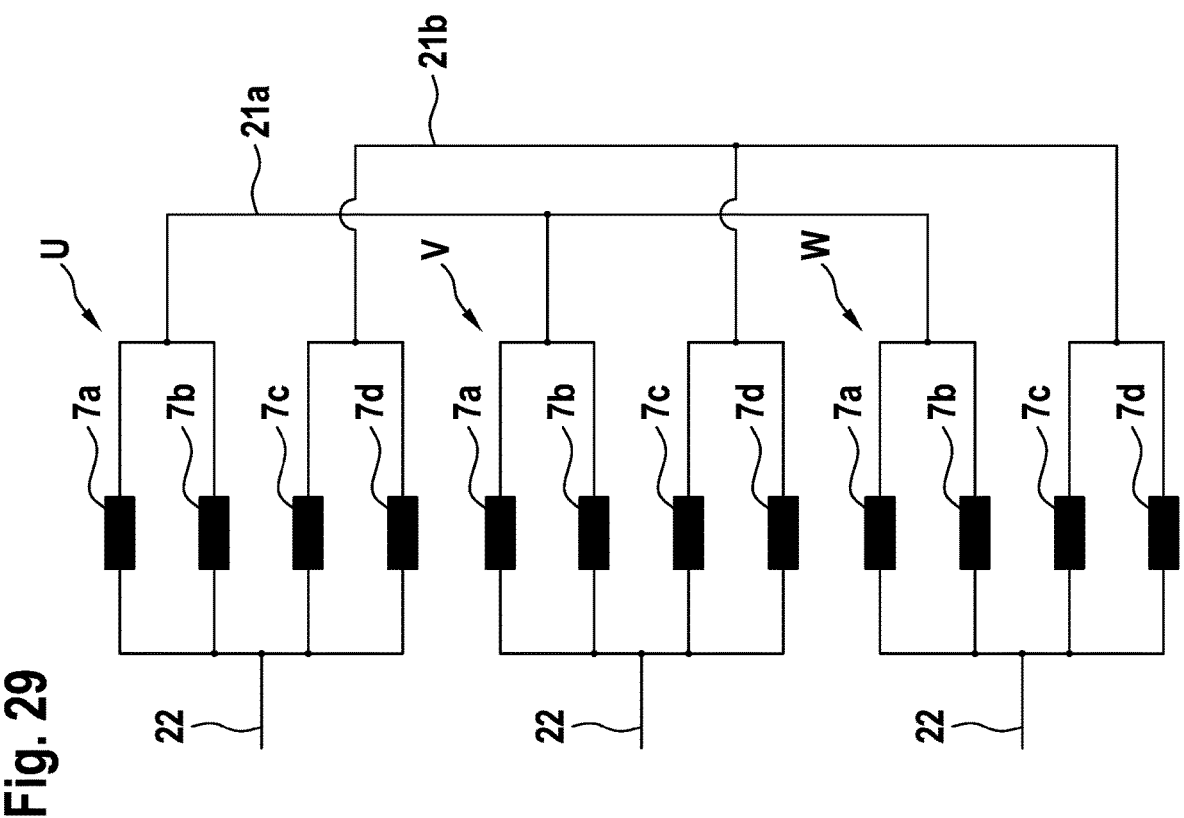
Figure 28:
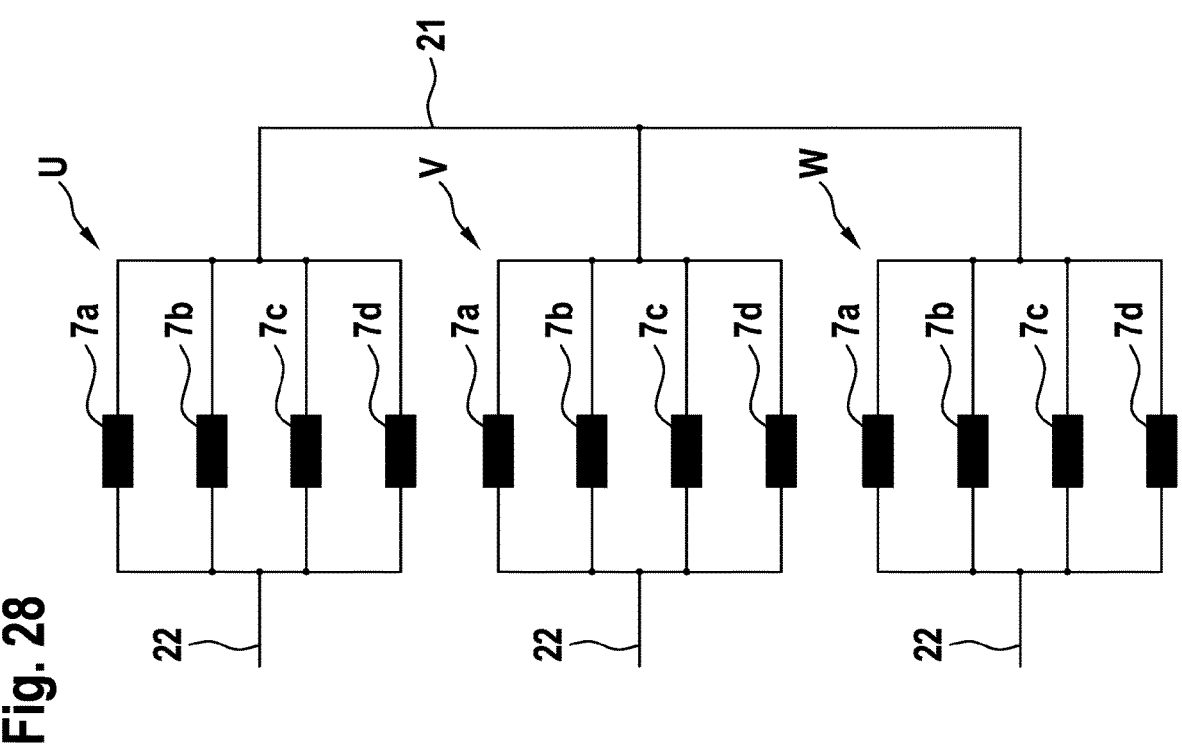
Figure 30:
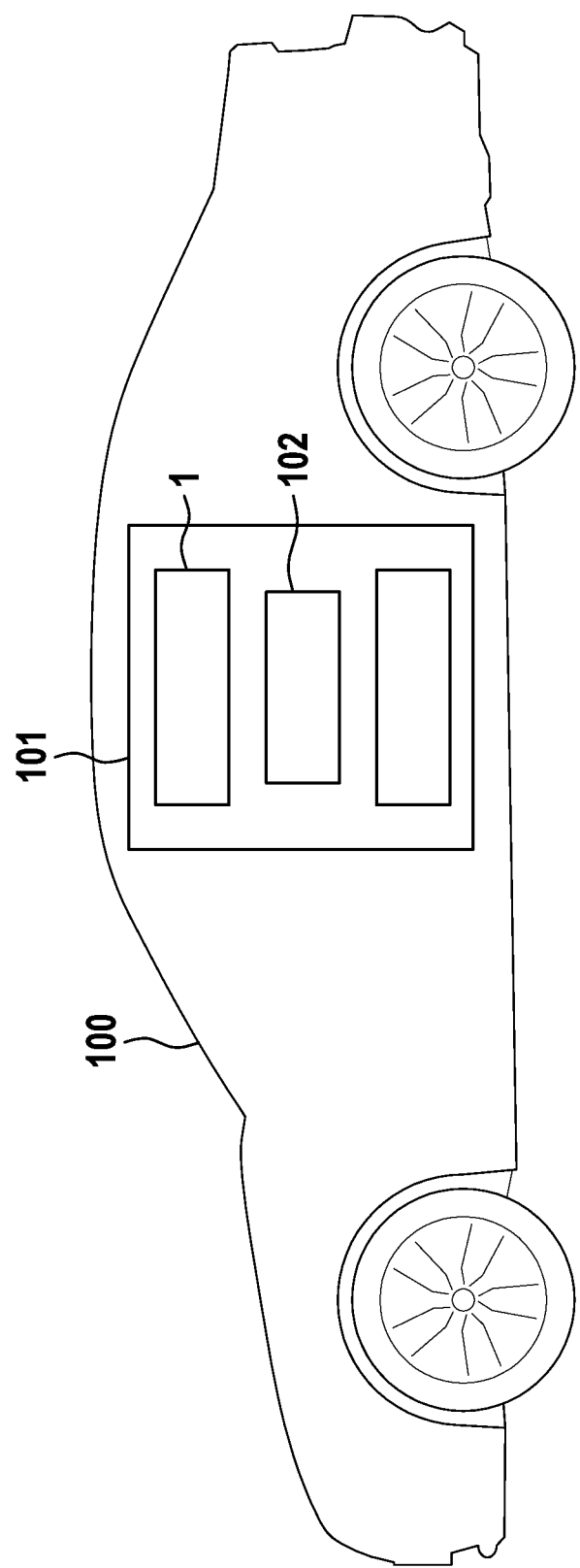

Further advantages and details of the present invention will become apparent from the embodiments described below and from the drawings. These are schematic representations and show:

FIG. 1 a perspective view of a first exemplary embodiment of the stator according to the invention;

FIG. 2 a detailed view of the stator shown in FIG. 1 in the region of a first end face of the stator;

FIGS. 3a and 3b a winding schema of one phase of the stator shown in FIG. 1;

FIGS. 4 to 7 in each case two shaped conductors connected by a first connector of the stator shown in FIG. 1;

FIGS. 8 to 13 in each case two shaped conductors connected by a second connector of the stator shown in FIG. 1;

FIG. 14 a plurality of shaped conductors connected by first and third connectors of the stator shown in FIG. 1;

FIGS. 15 to 22 in each case two shaped conductors of the stator shown in FIG. 1 connected by a third connector;

FIG. 23 a frontal view of the first end face of the first exemplary embodiment;

FIGS. 24a and 24b a winding schema of a second exemplary embodiment of the stator according to the invention;

FIG. 25 a frontal view of the first end face of the second exemplary embodiment;

FIGS. 26a and 26b a winding schema of a third exemplary embodiment of the stator according to the invention;

FIG. 27 a frontal view of the first end face of the third exemplary embodiment;

FIGS. 28 and 29 in each case a circuit diagram of the paths of a stator according to the first to third exemplary embodiments; and FIG. 30 a schematic diagram of an exemplary embodiment of the electric machine according to the invention for driving a vehicle.

FIG. 1 and FIG. 2 each show a first exemplary embodiment of a stator 1, wherein FIG. 1 is a partial perspective view and FIG. 2 is an associated detailed view in the region of a first end face 2a of the stator 1.

The stator 1 has three phases U, V, W (N=3), four pole pairs (P=4) and a hole number two (q=2). The stator comprises a stator core 3 with 48 slots 4 and 384 shaped conductors 5, which are arranged in eight layers 6a to 6h (L=8) radially layered in the slots 4. Here, the first layer 6a is the radially outermost layer and the eighth layer 6h the radially innermost layer, wherein the second to seventh layers 6b to 6g are denoted in the order of their indexing from the outside to the inside.

The shaped conductors 5 form four paths 7a to 7d per phase U, V, W, which can be connected in series or in parallel with one another. The shaped conductors 5 are further arranged in 16 winding zones 8, each extending radially over layers 6a to 6h and circumferentially over two directly adjacent slots 4. Here, the number of winding zones corresponds to twice the number of pole pairs, i.e., the number of poles, and the number of immediately adjacent slots 4 over which a winding zone 8 extends corresponds to the number of holes q. Each winding zone 8 is in turn subdivided into a number of partial winding zones 8a, 8b corresponding to the number of holes q, said partial winding zones extending over all layers 6a to 6h and being immediately adjacent in the circumferential direction. In the present exemplary embodiment, the stator 1 is formed as a non-chorded stator, and therefore each partial winding zone 8a, 8b comprises exactly one slot 4.

The shaped conductors 5 of each path 7a to 7d are connected in a series circuit, which is provided by connectors arranged at both end faces 2a, 2b of the stator core 3. First connectors 9a to 9e, second connectors 10a to 10f, and third connectors 11a to 11h are provided here.

FIG. 3a and FIG. 3b show a winding schema of the stator 1 according to the first exemplary embodiment.

In the uppermost row of FIG. 3a and FIG. 3b, numbers "1" to "48" of the slots 4 are indicated in a clockwise direction with respect to the end face 2a, wherein FIG. 3a and FIG. 3b are divided between slot 4 numbers "22" and "23". The upper table shows, with reference to the slots 4 and the layers 6a to 6h, the position of a start and an end of a path 7a to 7d, respectively, for the phases U, V, W, wherein U+, V+, W+ denote winding zones 8 in which the shaped conductors 5 are passed through in a first current direction, and U−, V−, W− denote winding zones 8 in which the shaped conductors 5 are passed through in a second current direction opposite to the first current direction. Below the table, for each of paths 7a to 7d of phase U, the position of a shaped conductor 5 in the winding zones 8 is shown in each case. Here, the first connectors 9a to 9d, the second connectors 10a to 10f, and the third connectors 11a to 11h at the first end 2a are shown by dashed arrows, and the first connectors 9e at the second end 2b are shown by solid arrows. As can be seen from FIG. 3a and FIG. 3b, each path 7a to 7d comprises a number of groups 12a to 12d of successively series-connected shaped conductors 5 corresponding to half the number of layers 6a to 6g. Here, a symbol "x" indicates ends, i.e. outer shaped conductors 5 with respect to the series connection, of a path 7a to 7d, which can be connected to a phase connection. A symbol "o" indicates corresponding ends of a path 7a to 7d, which are connected to form a star point. Remaining shaped conductors 5 are marked with the symbol "+".

Pairs of groups 12a to 12d adjacent with respect to the series connection are each connected by one of the second connectors 10a to 10f. The second connectors 10a to 10f each provide an offset by two layers 6a to 6h in the radial direction. The second connectors 10a, 10e and 10e of the paths 7a and 7c provide an offset by five (N·q−1) slots 4 in the circumferential direction, whereas the second connectors 10b, 10d, 10f of the paths 7b and 7d provide an offset by seven (N·q+1) slots 4 in the circumferential direction. Thus, in a particular path 7a to 7d, the first group 12a is located in the eighth layer 6h and in the seventh layer 6g, the second group 12b is located in the sixth layer 6f and in the fifth layer 6e, the third group 12c is located in the fourth layer 6d and in the third layer 6c, and the fourth group 12d is located in the second layer 6b and in the first layer 6a. Consequently, in each winding zone 8 of a phase U, V, W there is exactly one shaped conductor 5 of a group 12a to 12d. In other words, the shaped conductors 5 of a group 12a to 12d form a circumferential circuit.

Each group 12a to 12d is formed by two arrangements 13a, 13b of four shaped conductors 5, which are arranged alternately in the two immediately adjacent layers 6a to 6h and are connected in series by the first connectors 9a to 9e. By way of example, the first arrangement 13a of the first path 7a thus comprises the shaped conductors 5 arranged in the eighth layer 6h and in the seventh layer 6g and in the slots numbered "19", "25", "31" and "47". Accordingly, the second arrangement 13b of the first path 7a comprises the shaped conductors 5 arranged in the eighth layer 6h and in the seventh layer 6g and in the slots with the numbers "44", "2", "8" and "14". Each first connector 9a to 9e between two shaped conductors directly adjacent with respect to the series connection of an arrangement 13a, 13b provides an offset here by six slots 4 in the circumferential direction and an offset by one layer 6a to 6h in the radial direction.

The arrangements 13a, 13b are each located in a different one of the two partial winding zones 8a, 8b of a winding zone 8. Here, the first arrangements 13a of the first path 7a and of the fourth path 7d are located in the first partial winding zone 8a of a winding zone 8, and the first arrangements 13b of the second path 7b and of the third path 7c are located in the second partial winding zone 8b of a winding zone 8. Accordingly, the second arrangements 13b of the first path 7a and of the fourth path 7d are located in the second partial winding zone 8b of a winding zone 8, and the second arrangements 13b of the second path 7b and the third path 7c are located in the first partial winding zone 8b of a winding zone 8.

The arrangements 13a, 13b of a group 12a to 12d are connected by one of the third connectors 11a to 11g. The third connectors 11a, 11c, 11e, 11g provide an offset here by seven (N·q+1) slots 4, whereas the third connectors 11b, 11d, 11f, 11h provide an offset by five (N·q−1) slots 4. Consequently, the third connectors 11a, 11c, 11e, 11g are provided to connect arrangements 13a, 13b arranged in the first partial winding zone 8a to arrangements 13a, 13b arranged in the second partial winding zone 8b, whereas the third connectors 11b, 11d, 11f, 11h are provided to connect arrangements 13a, 13b arranged in the second partial winding zone 8b to arrangements 13a, 13b arranged in the first partial winding zone 8a. In order to ensure the continuous change between the immediately adjacent layers 6a to 6h, only the third connectors 11a, 11c, 11e, 11g providing an offset by seven slots 4 are provided in the first path 7a and the third path 3c, and only the third connectors 11b, 11d, 11f, 11h providing an offset by five slots 4 are provided in the second path 7b and the fourth path 7d.

As is further shown in FIG. 3a and FIG. 3b, the paths 7a to 7d are subdivided into a number of sets 14a, 14b corresponding to the number of holes q, i.e., in the present case two sets 14a, 14b, wherein the first set 14a comprises the first path 7a and the second path 7b, and the second set 14b comprises the third path 7c and the fourth path 7d. Both sets 14a, 14b have the same sequence of connectors 9a to 9e, 10a to 10f, 11a to 11g, but are separated by one winding zone 8 or by six (N·q) slots 4 offset from each other in the circumferential direction.

From the overall view of the paths 7a to 7c, it thus follows that the winding zones 8 for the phase U are completely occupied by shaped conductors 5. This means that in each partial winding zone 8a, 8b of a winding zone, all layers 6a to 6h are occupied by a shaped conductor 5. Winding zones 8 of the other phases V, W are occupied analogously to the phase U with shaped conductors 5 connected by corresponding connectors 9a to 9e, 10a to 10f, 11a to 11g.

FIGS. 4 to 13 and FIGS. 15 to 22 each show two shaped conductors 5 connected by a connector 9a to 9d, 10a to 10f, 11a to 11g.

Figure 4:
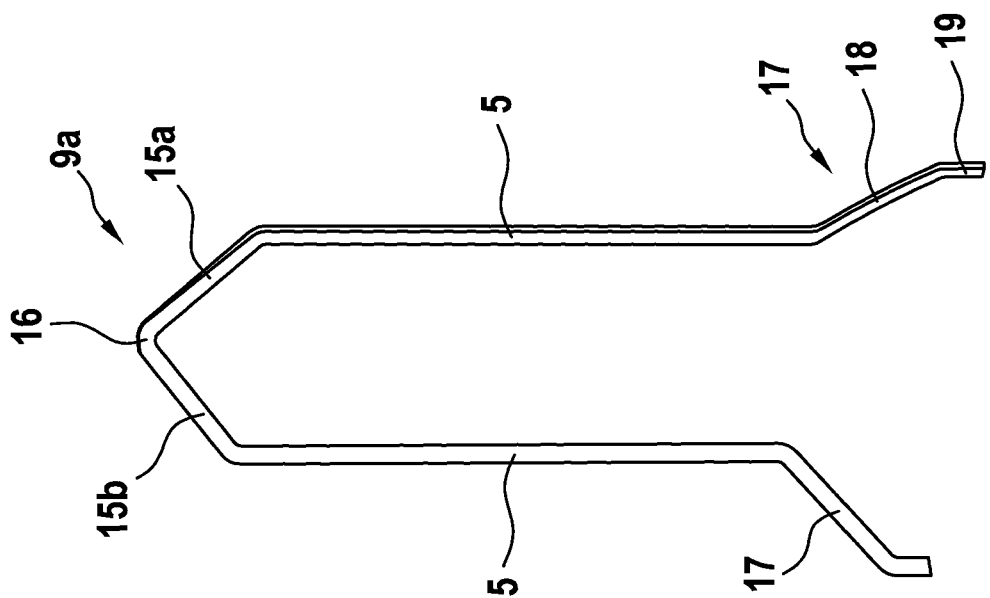

FIG. 4 shows two shaped conductors 5 arranged parallel to each other and formed in one piece with the first connector 9a. The first connector 9a comprises two protruding portions 15a, 15b that protrude at an obtuse angle from the relevant shaped conductor 5. The protruding portions 15a, 15b extend circumferentially and axially at the radial position where the shaped conductor 5 from which they protrude is located. As can also be seen from FIG. 2, the protruding portions 15a, 15b thus have an arc shape.

The protruding portions 15a, 15b are connected to each other at their ends facing away from the shaped conductor 5 by a transition portion 16. The transition portion 16 provides the offset in the radial direction. Consequently, the transition portion 16 extends substantially in the circumferential direction and in the radial direction.

A connecting element 17, which is formed in one piece with a shaped conductor 5, is connected to the shaped conductor 5 at its end opposite the first connector 9a. The connecting element 17 comprises a protruding portion 18, which protrudes from the shaped conductor 5 at an obtuse angle. The protruding portion 18 extends from the radial position of the shaped conductor 5 from which it protrudes, bent radially outward in the circumferential direction and axial direction. As can also be seen from FIG. 1, the protruding portion 18 thus has an arc shape. Adjacently to the protruding portion 18 is a joining portion 19 which extends substantially only in the axial direction.

The first connectors 9e provided at the second end face 2b are formed by the integrally bonded joining, for example by welding, of the joining portions 19 of connecting elements 17 which adjoin two successive shaped conductors 5 with respect to the series connection. In this case, the joining portions 19 are arranged with their flat sides parallel to one another. The fact that the protruding portions 18 of the connecting elements 17 are bent outward ensures a sufficient insulating distance between two radially adjacent first connectors 9e.

The other components of the stator 1 shown in FIGS. 5 to 13 and FIGS. 15 to 22 correspond to the component shown in FIG. 4 in terms of their structure consisting of two shaped conductors 5, a connector 9b to 9d, 10a to 10f, 11a to 11g, which has protruding portions 15a, 15b and a transition portion 16, and two connecting elements 17, each comprising a protruding portion 18 and a joining portion 19, wherein in each case a different offset in the radial direction and/or circumferential direction is provided. Although the protruding portions 15a, 15b, 18 are shown here obliquely, i.e., with a constant pitch in the axial direction, the protruding portions 15a, 15b, 18 can in each case or individually have a different form, for example can be bent along the axial direction.

Figure 5:
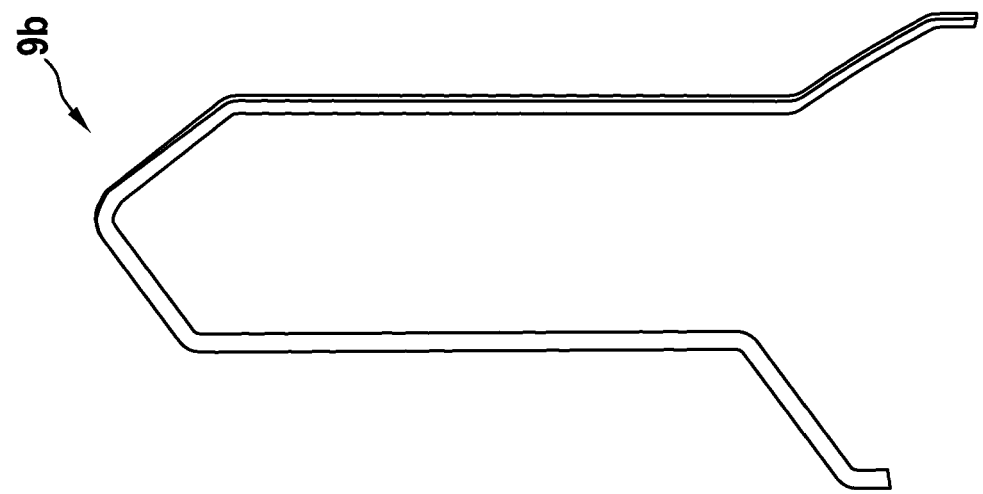
Figure 6:
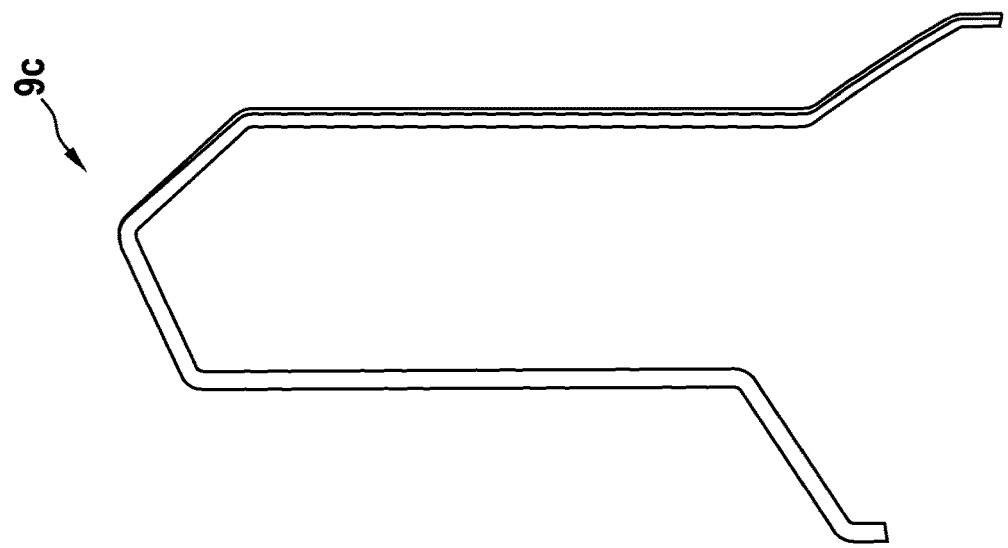
Figure 7:
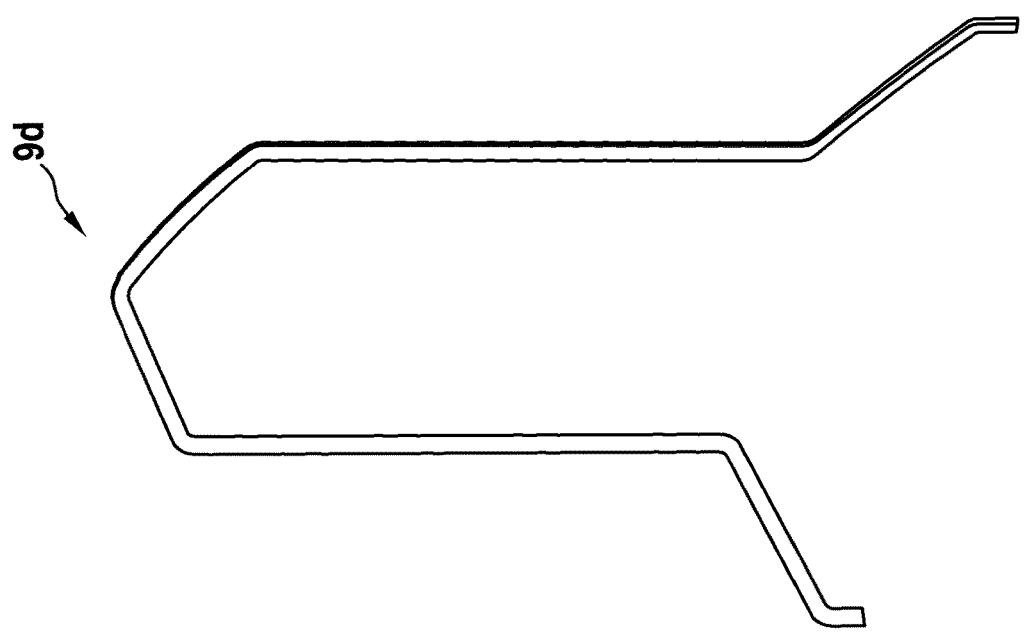

The first connectors 9a to 9d shown in FIG. 4 to FIG. 7 each provide the offset by six slots 4 in the circumferential direction and the offset by one layer 6a to 9h. The first connector 9a shown in FIG. 4 provides the offset from the eighth layer 6h to the seventh layer 7g. The first connector 9b shown in FIG. 5 provides the offset from the fifth layer 6e to the sixth layer 6f. The first connector 9c shown in FIG. 6 provides the offset from the fourth layer 6d to the third layer 6d. The first connector 9d shown in FIG. 7 provides the offset from the first layer 6a to the second layer 6b.

FIG. 8 to FIG. 12 show shaped conductors 5 connected by a second connector 10a to 10f, respectively.

Figure 9:
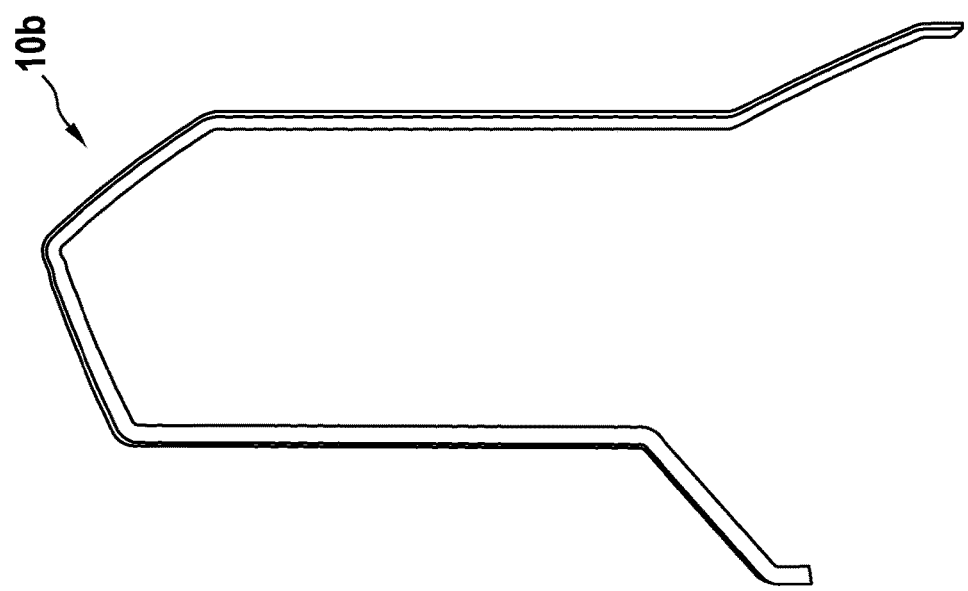
Figure 8:
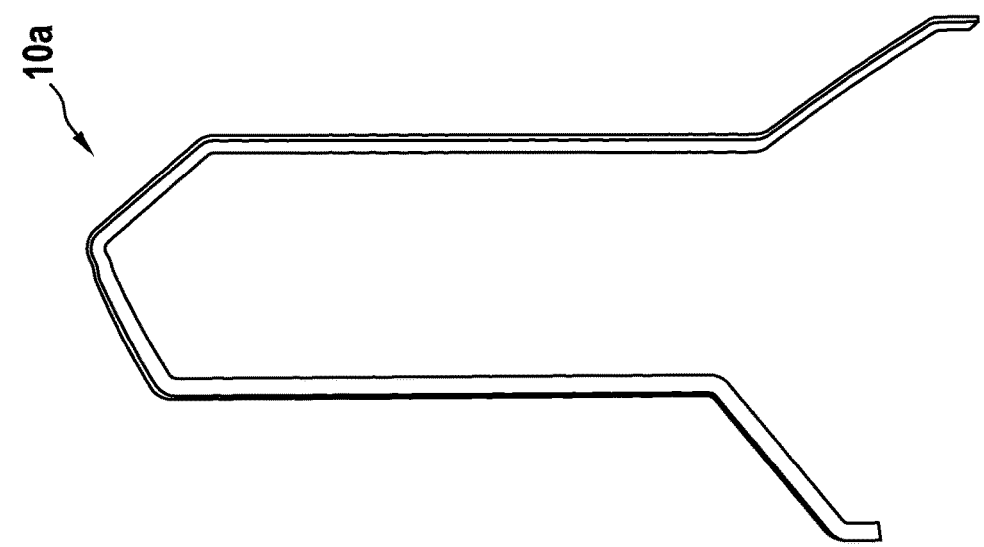

FIG. 8 shows the second connector 10a and FIG. 9 the second connector 10b. Both connectors 10a, 10b provide the offset in the radial direction from the eighth layer 6h to the sixth layer 6f. The second connector 10a provides an offset in the circumferential direction by five slots 4, whereas the second connector 10b provides an offset by seven slots 4. As can be seen from a comparison of FIG. 8 and FIG. 9, the second connector 10a is axially shorter than the second connector 10b is. As a result, the second connector 10a in the first path 7a can be arranged at the same radial position axially further inward than the second connector 10b can in the second path 7b. This applies analogously to the second connector 10a in the third path 7c and the second connector 10b in the fourth path 7d.

Figure 10:
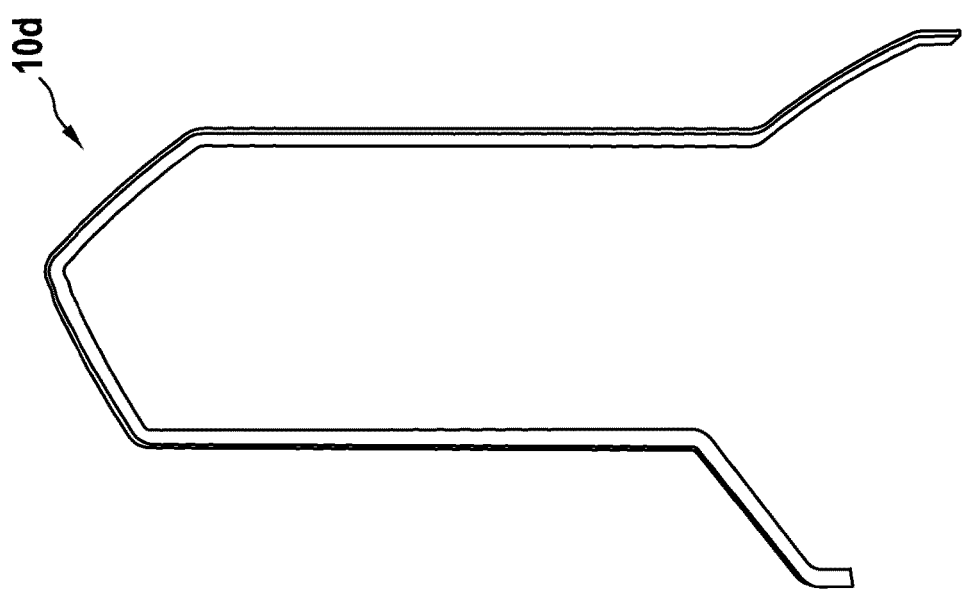
Figure 11:
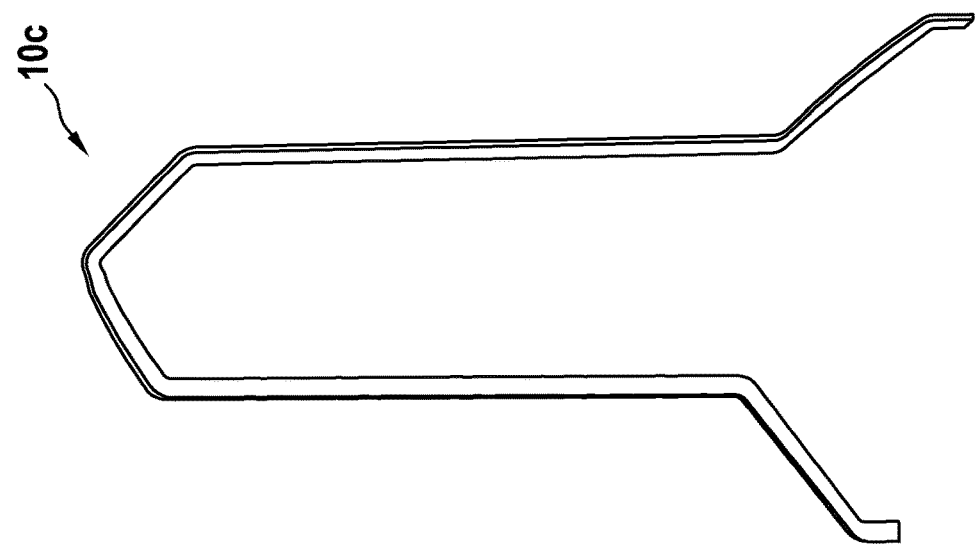
Figure 13:
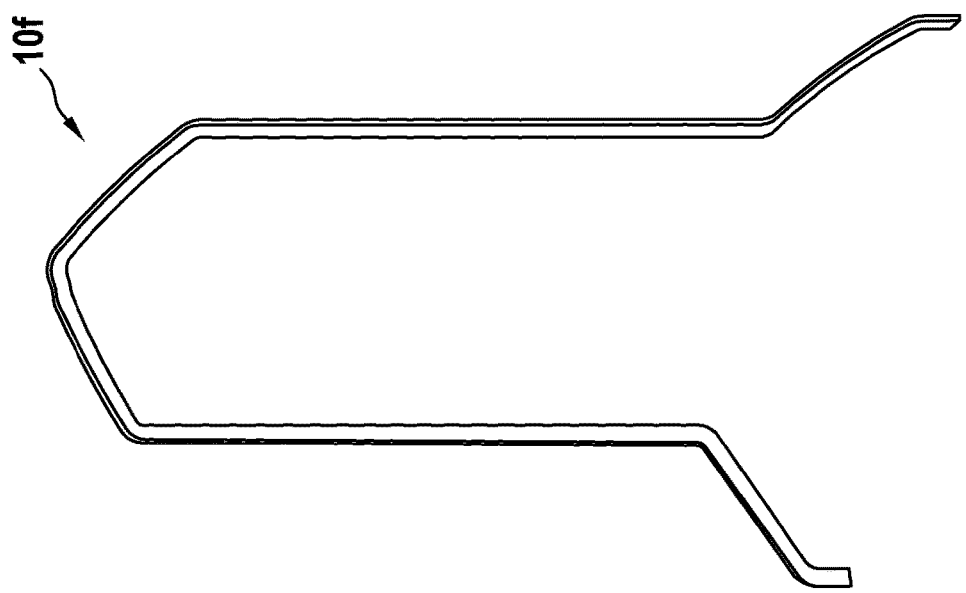
Figure 12:
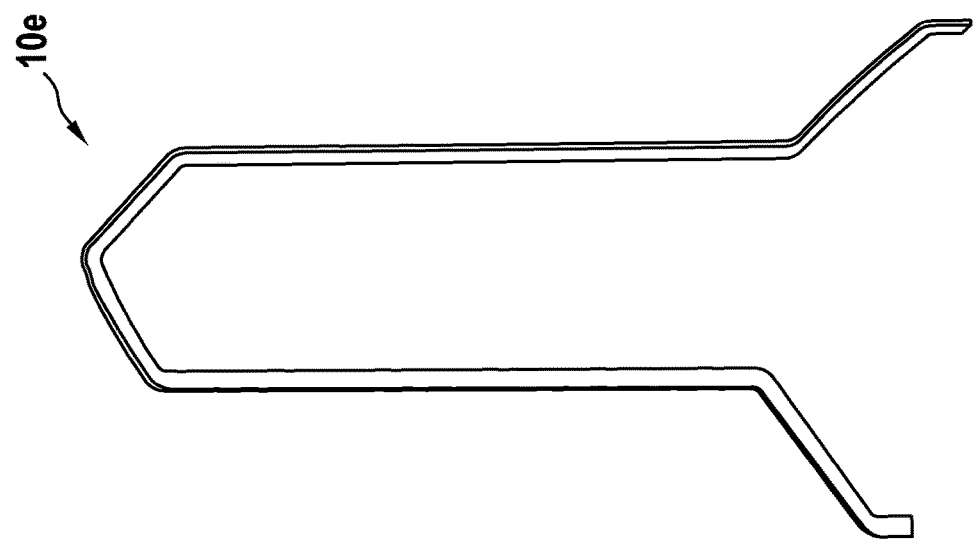

FIG. 10 shows the second connector 10c and FIG. 11 the second connector 10d. Both second connectors 10e, 10d provide the offset in the radial direction from the fifth layer 6e to the third layer 6c. FIG. 12 shows the second connector 10e and FIG. 13 the second connector 10f. Both second connectors 10e, 10f provide the offset in the radial direction from the fourth layer 6d to the second layer 6b. Analogously to the second connectors 10a, 10b, the second connectors 10c, 10e provide the offset in the circumferential direction by five slots 4, and the second connectors 10d, 10f provide the offset in the circumferential direction by seven slots 4. Again, the second connectors 10c, 10e are axially shorter than the second connectors 10d, 10f are, so that the second connectors 10c, 10e in the first path 7a and in the third path 7c are arranged at the same radial position axially further inward than the second connectors 10d, 10f in the second path 7b and in the fourth path 7d.

FIG. 14 shows a plurality of shaped conductors 5 of the phase W of the stator shown in FIG. 1 connected by first connectors 9a to 9d and third connectors 11a to 11c, 11e, 11g, wherein the third connectors 11d, 11f, 11h are hidden in the representation shown in FIG. 14.

It can be seen clearly that the third connector 11b is arranged axially further inward to reduce the winding overhang than the third connector 11a, which—like the third connector 11b—also connects shaped conductors 5 arranged in the seventh layer 6g and the eighth layer 6h. This applies accordingly for the arrangement of the third connectors 11c, 11d, which connect shaped conductors 5 arranged in the fifth layer 6e and in the sixth layer 6f, for the arrangement of the third connectors 11e, 11f, which connect shaped conductors 5 arranged in the third layer 6c and in the fourth layer 6d, and the arrangement of the third connectors 11g, 11h, which connect shaped conductors 5 arranged in the first layer 11a and in the second layer 11b.

With regard to the substantially U-shaped configuration of the pairs of shaped conductors 5 connected by the third connectors 11a to 11h, such an axial arrangement of the pairs can also be referred to as a "U-in-U shaped conductor" or "U-inside-U pin". The explanations regarding the third connectors 11a to 11h based on FIG. 14 can also be applied to the arrangement of the second connectors 10a to 10f.

FIG. 15 to FIG. 22 show shaped conductors 5 connected by a third connector 11a to 11h, respectively.

Figure 15:
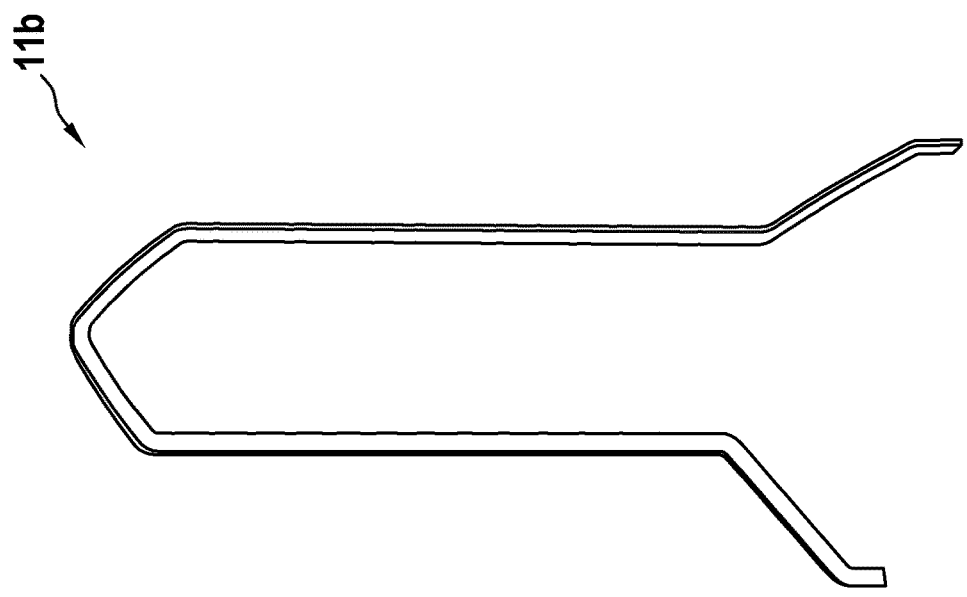
Figure 16:
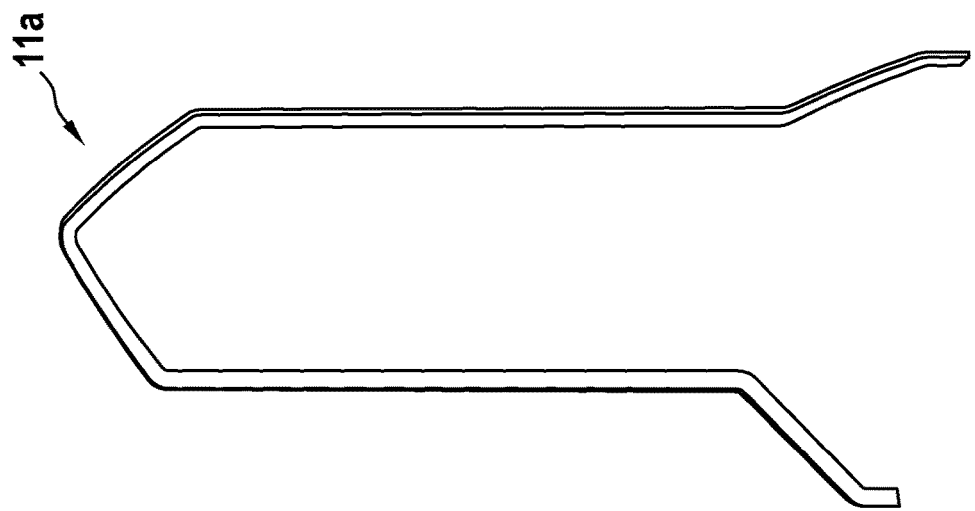

FIG. 15 shows the third connector 11a and FIG. 16 the third connector 11b. Both connectors 11a, 11b provide the offset in the radial direction from the eighth layer 6h to the seventh layer 6g. The third connector 11a provides an offset in the circumferential direction by seven slots 4, whereas the third connector 11b provides an offset by five slots 4. As can be seen from a comparison of FIG. 15 and FIG. 16, the third connector 11a is axially shorter than the third connector 11b is in order to arrange the third connectors 11a, 11b axially one inside the other at the same radial position as previously described.

Figure 17:
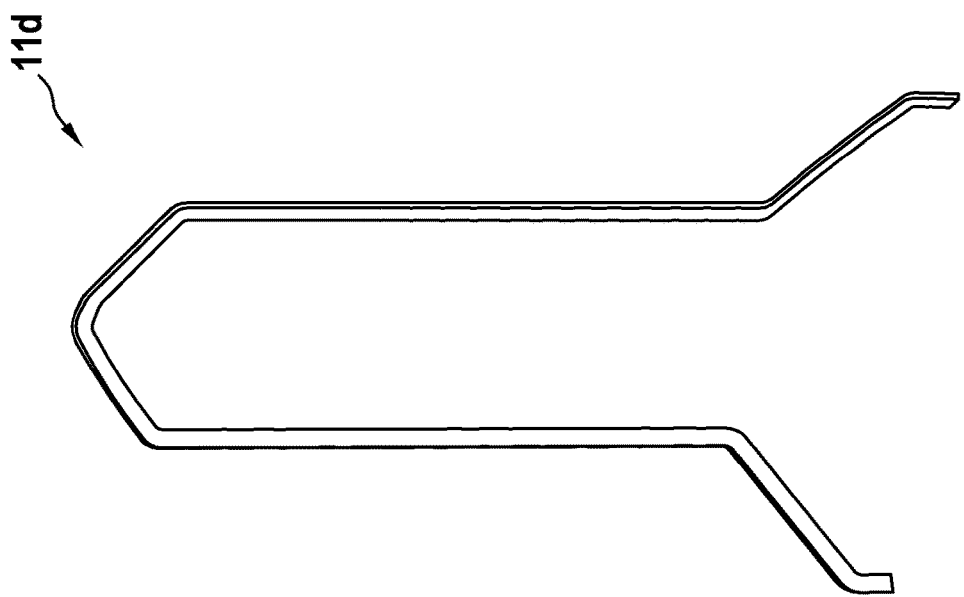
Figure 18:
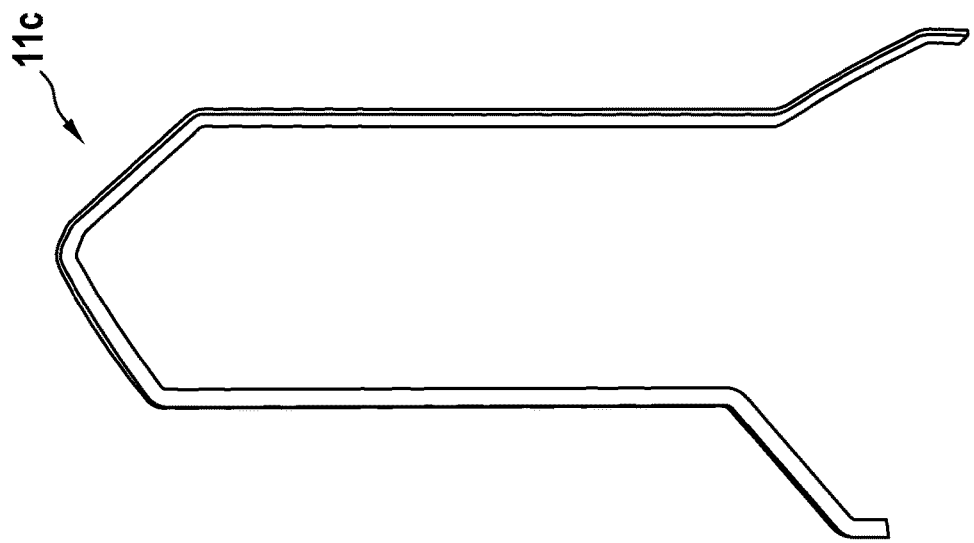
Figure 19:
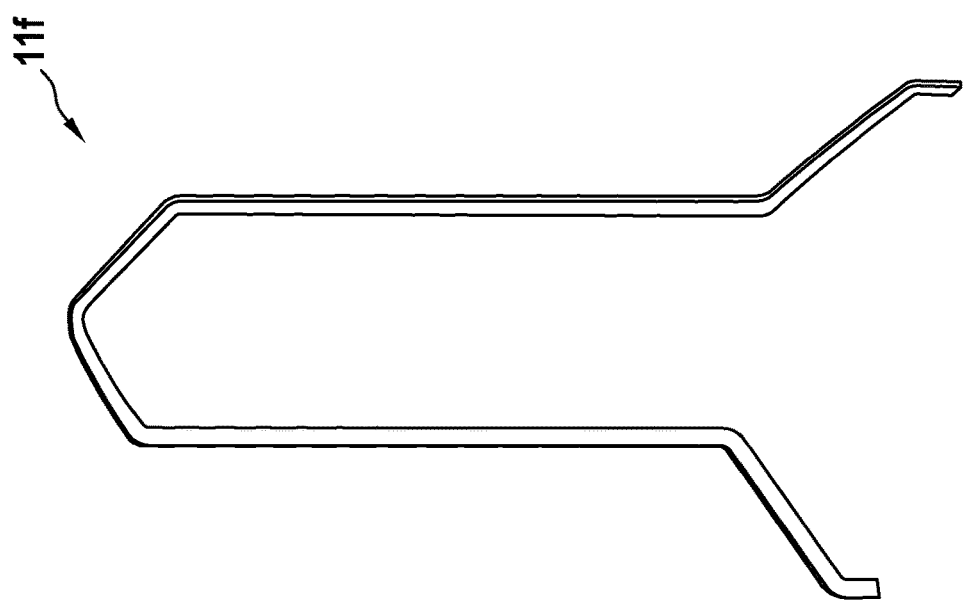
Figure 20:
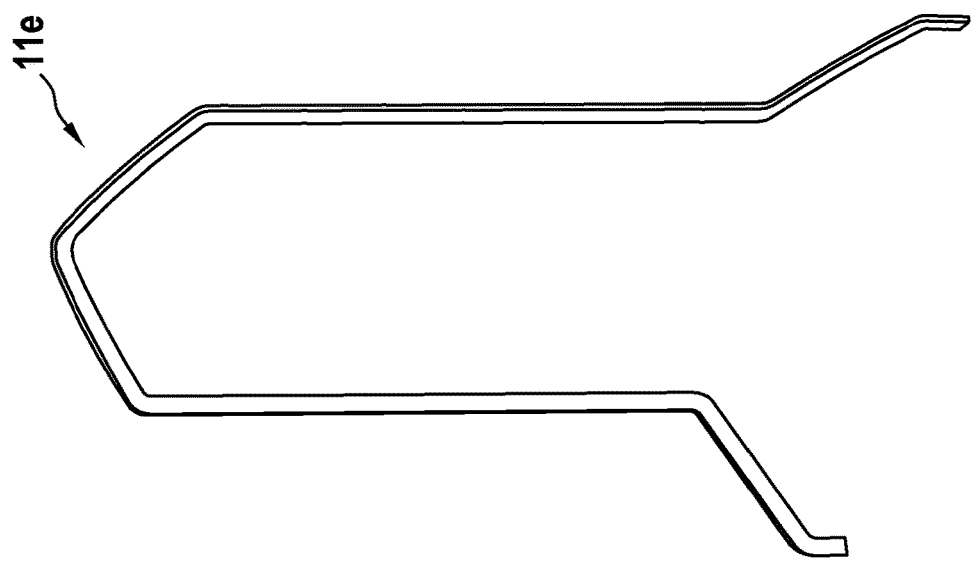
Figure 21:
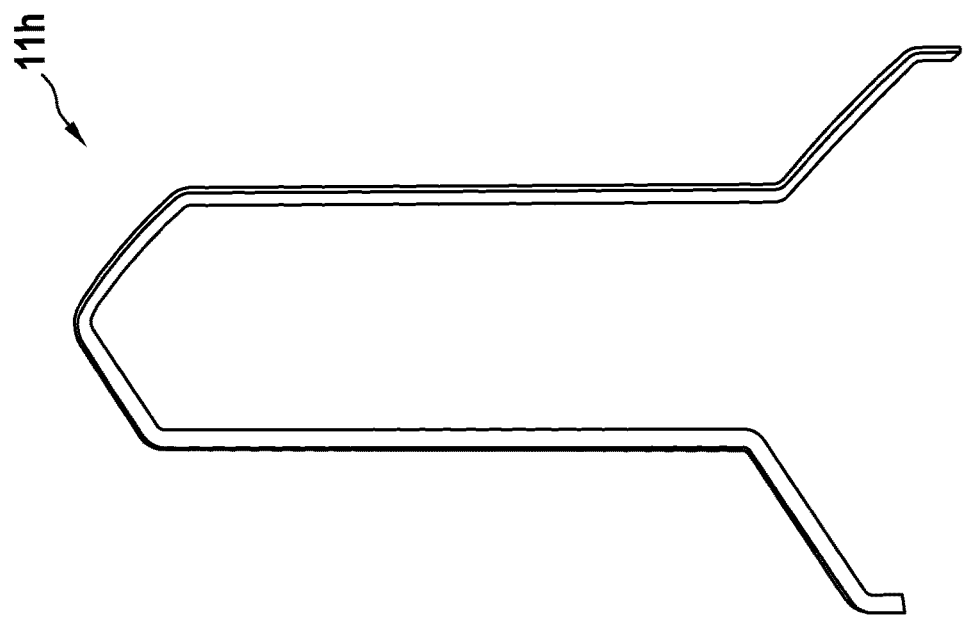
Figure 22:
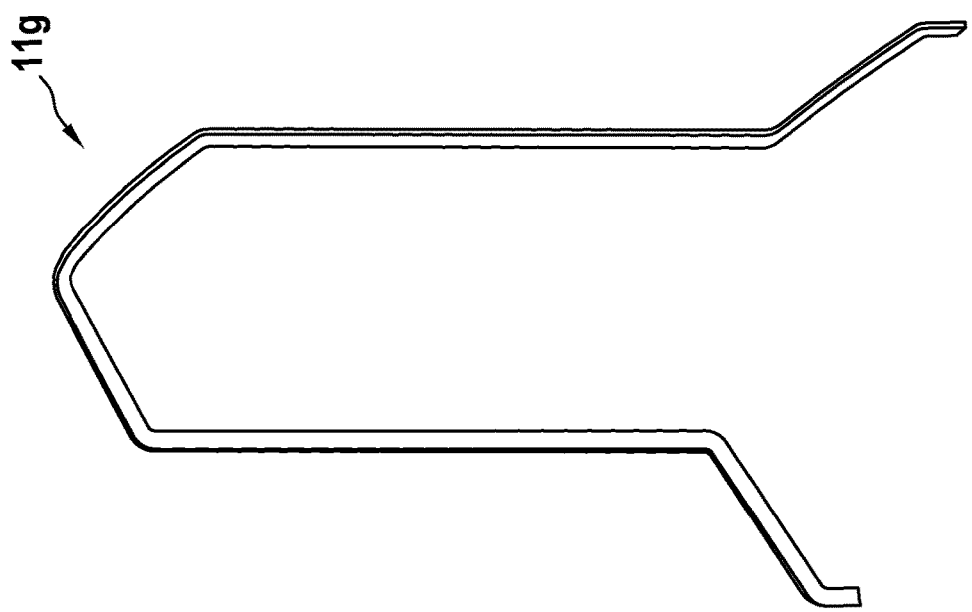

FIG. 17 shows the third connector 11c and FIG. 18 the third connector 11d. Both third connectors 11c, 11d provide the offset in the radial direction from the fifth layer 6e to the sixth layer 6f. FIG. 19 shows the third connector 11e and FIG. 20 the third connector 11f. Both third connectors 11e, 11f provide the offset in the radial direction from the fourth layer 6d to the third layer 6c. FIG. 21 shows the third connector 11g and FIG. 22 the third connector 11h. Both third connectors 11g, 11h provide the offset in the radial direction from the first layer 6a to the second layer 6b. Similarly to the third connectors 11a, 11b, the third connectors 11c, 11e, 11g provide the offset in the circumferential direction by seven slots 4 and the third connectors 11d, 11f, 11h provide the offset in the circumferential direction by five slots 4.

Consequently, the multi-path winding structure of the stator 1 can be provided with only four types of first connectors 9a to 9d, six types of second connectors 10a to 10f and eight types of third connectors 11a to 11h. Since the shaped conductors 5 connected by the aforementioned connectors 9a to 9d, 10a to 10f and 11a to 11h can be identical, the small number of only eighteen types makes it possible to manufacture the stator 1 easily and with good automation. In addition, the outer shaped conductors 5 of paths 7a to 7d with respect to the series connection are located in a small connection window (see slots 4 with numbers 13 to 34 in FIG. 3a and FIG. 3b), which means that a connection device that saves installation space can be used. It is also advantageous that the outer shaped conductors 5 marked with an "o" in FIG. 3a and FIG. 3b, which can serve for connection to a star point connector, each have only one intersection with the shaped conductors 5 marked with an "x", which can serve as phase connections to an inverter, which simplifies the design structure of the connection device.

Referring again to FIG. 2, it can be seen that some of the shaped conductors 5 in the first layers 6a and seventh layers 6g of some slots 4 at the first end face 2a are not connected to by first connectors 9a to 9d, second connectors 10a to 10f, or third connectors 11a to 11h. In these regions, there are located outer shaped conductors 5 of a path 7a to 7d with respect to the series connection. These outer shaped conductors are marked in FIG. 3a and FIG. 3b with the symbols "o" and "x".

The free end of these shaped conductors 5 at the first end face 2a protrudes from the stator core 3 in a manner extended beyond the transition portions 16 (see FIG. 4). The free end of the outer shaped conductors 5 has an obtuse-angled protruding portion 20a extending in the axial direction and circumferential direction and a straight portion 20b adjoining the protruding portion 20a and extending further in the axial direction than the transition portions 16. The straight portions 20b serve for electrical connection to the connection device.

A connecting element 17 with a protruding portion 18 and a joining portion 19 as shown in FIG. 4 is connected to the second end face 2b of the outer shaped conductor 5. The joining portion 19 is joined in an integrally bonded manner to the joining portion 19 of the second-outer shaped conductor 5 of the corresponding path 7a to 9d.

Lastly, FIG. 1 and FIG. 2 also show slot boxes 20c extending through the slots 4, surrounding the shaped conductors 5 and lining the slots 4. The slot boxes serve to electrically insulate the shaped conductors 5 from the stator core 3. Typically, the slot boxes 20c are made of insulation paper.

FIG. 23 is a frontal view of the first end face 2a of the stator 1. In particular, the first connectors 9a to 9d, the second connectors 10a to 10f, and the third connectors 11a to 11h can be seen here.

FIG. 24a and FIG. 24b show a winding schema of a second exemplary embodiment of a stator 1. The manner of representation corresponds to FIG. 3a and FIG. 3b. The explanations for the first exemplary embodiment can be transferred to the second exemplary embodiment, insofar as no deviations are described below. In this context, identical or similarly acting components are provided with the same reference signs.

The stator 1 according to the second exemplary embodiment is a left-chorded stator 1. Accordingly, each partial winding zone 8a, 8b extends over at least two directly adjacent slots 4, wherein each partial winding zone has an offset (V=1) by one slot 4 in the radial direction. The offsets in the winding zones 8 have—viewed from radially inward to radially outward—in each case an orientation to the left or counter-clockwise as seen from the first end face 2a and occur after four layers 6e to 6h (L/2).

To provide such a left-chorded stator 1, the first connectors 9a to 9d and third connectors 11a to 11h described in the first exemplary embodiment are used and are arranged only beyond the offset in the first layer 6a to the fourth layer 6d, circumferentially offset by a slot 4.

With regard to the second connectors 10a to 10f, the following deviations arise: The second connectors 10a, 10e, which do not cover the offset, in the first path 7a and in the third path 7c provide an offset by five slots 4 (N·q−1), whereas the second connectors 10b, 10f, which do not cover the offset, in the second path 7b and in the fourth path 7d provide an offset by seven slots 4 (N·q+1). The second connector 10c, which covers the offset, in the first path 7a and in the third path 7c provides an offset by four slots 4 (N·q−2), whereas the second connector 10d, which covers the offset, in the second path 7b and in the fourth path 7d provides an offset by six slots 4 (N·q). Thus, in the second exemplary embodiment, it is also possible to arrange the second connectors 10a and 10b, the second connectors 10c, 10d, and the second connectors 10e, 10f axially one inside the other.

FIG. 25 is a frontal view of the first end face 2a of the stator 1 according to the second exemplary embodiment. In particular, the first connectors 9a to 9d, the second connectors 10a to 10f, and the third connectors 11a to 11h can be seen.

FIG. 26a and FIG. 26b show a winding schema of a third exemplary embodiment of a stator 1. The manner of representation corresponds to FIG. 3a and FIG. 3b. The explanations for the first exemplary embodiment can be transferred to the third exemplary embodiment, insofar as no deviations are described below. Here, identical or similarly acting components are provided with the same reference signs.

The stator 1 according to the third exemplary embodiment is a right-chorded stator 1. Accordingly, each partial winding zone 8a, 8b extends over at least two directly adjacent slots 4, wherein each partial winding zone has an offset (V=1) by a slot 4 in the radial direction. The offsets in the winding zones 8 have—viewed from radially inward to radially outward—in each case an orientation to the right or clockwise as seen from the first end face 2a and occur after four layers 6e to 6h (L/2).

To provide such a right-chorded stator 1, the first connectors 9a to 9d and third connectors 11a to 11h described in the first exemplary embodiment are used, which are arranged offset in the circumferential direction by a slot 4 only beyond the offset in the first layer 6a to the fourth layer 6d.

With regard to the second connectors 10a to 10f, the following deviations arise: The second connectors 10a, 10e, which do not cover the offset, in the first path 7a and in the third path 7c provide an offset by five slots 4 (N·q−1), whereas the second connectors 10b, 10f, which do not cover the offset, in the second path 7b and in the fourth path 7d provide an offset by seven slots 4 (N·q+1). The second connector 10c, which covers the offset, in the first path 7a and in the third path 7c provides an offset by four slots 4 (N·q), whereas the second connector 10d, which covers the offset, in the second path 7b and in the fourth path 7d provides an offset by eight slots 4 (N·q+2). Thus, in the third exemplary embodiment, it is also possible to arrange the second connectors 10a and 10b, the second connectors 10c, 10d and the second connectors 10e, 10f axially one inside the other.

FIG. 27 is a frontal view of the first end face 2a of the stator 1 according to the third exemplary embodiment. In particular, the first connectors 9a to 9d, the second connectors 10a to 10f and the third connectors 11a to 11h can be seen.

FIG. 28 and FIG. 29 are each a circuit diagram of the paths 7a to 7d of a stator 1 according to one of the previously described exemplary embodiments.

FIG. 28 shows for each phase U, V, W that their paths 7a to 7d are connected in parallel and are connected by a star point connector 21 to form a star point. A phase connection 22 is provided on the side of each parallel connection opposite the star point connector 21.

FIG. 29 shows for each phase U, V, W that their paths 7a to 7d are connected in parallel at one of their ends and are connected to a phase connection 22. The other ends of the paths 7a to 7d are only connected in parallel in pairs, so that two star points are formed by means of two star point connectors 21a, 21b. Here, the star point connector 21a connects the first paths 7a and the second paths 7b of each phase U, V, W, and the star point connector 21b connects the third paths 7c and the fourth paths 7d of each phase U, V, W.

The star point connectors 21a, 21b and phase connections 22 shown in FIGS. 28 and 29 can be provided in all previously described embodiments by the aforementioned connection device, which is arranged at the first end face 2a. Of course, according to alternative embodiments, it is also possible that the paths 7a to 7d of a phase U, V, W are connected in series and/or that a delta connection is provided instead of a star connection.

According to a further exemplary embodiment, it is also possible for a stator to have a number of holes q=1, wherein the third connectors are then omitted. Such a stator then has at least P=4 pole pairs and at least twelve slots. Typically, two paths per phase are then provided.

According to a further exemplary embodiment, it is also possible for a stator to have a number of holes q=3. Then, typically, at least P=12 pole pairs and at least 108 slots are provided. Typically, six paths per phase are then provided. In each group, three arrangements and two third connectors are provided for a hole number q=3, so that each group occupies all three partial winding zones. In each case, three second and third connectors arranged in the same winding zone at the same radial position can then be arranged axially one inside the other, so that "U-in-U-in-U shaped conductors" are formed.

FIG. 30 is a schematic diagram of a vehicle 100 with an exemplary embodiment of an electric machine 101.

The electric machine 101 comprises a stator 1 according to one of the previously described exemplary embodiments and a rotor 102 arranged rotatable within the stator 1. The electric machine 101 is a rotating field machine, for example a permanently excited synchronous machine or an asynchronous machine. The electric 101 machine is configured as an electric motor.

The vehicle 100 is a partially or fully electrically driven vehicle, for example a battery electric vehicle (BEV) or a hybrid vehicle, wherein the electric machine 101 is set up to drive the vehicle 100.

As can be seen from FIG. 3a and FIG. 3b, the groups 12 a-d run in radially opposite directions after a circuit around the stator and a connector 10a-10e. As a result, the shaped conductors 5 of a subsequent group 12b-12d, with respect to the previous group 12a-12c, each lie alternately in directly adjacent slots of the same partial winding zone 8a, b, or in slots of the same partial winding zone 8a, b that are 3 layers apart.

For example, a shaped conductor 5 of the group 12a is arranged in the slot with number "2" in the 8th layer 6h. The shaped conductor 5 of the following group 12b, which is also arranged in the slot with number "2", is arranged in the 5th layer 6e. Subsequently, another shaped conductor 5 of group 12a is arranged in the slot with number "8" in the 7th layer 6g. The shaped conductor 5 of the subsequent group 12b, which is also arranged in the slot with number "8", is arranged in the 6th layer 6f, i.e. in a directly adjacent layer with respect to the shaped conductor 5 of group 12a.

The invention claimed is:

1. A stator for an electric machine the stator comprising:
a number N of phases;
a number P of pole pairs;
a number q of holes, wherein N≥3 and P≥2 and q≥1;
a stator core having at least 2·N·P·q slots and a number of 2·N·P·q·L shaped conductors arranged in a number L of layers radially layered in the slots, wherein L≥4 and is even,
wherein the shaped conductors form 2·q paths per phase, which can be connected in series or in parallel with one another, and are arranged in 2P winding zones, which each extend radially over L layers and in the circumferential direction over at least q directly adjacent slots,
wherein the shaped conductors of each path are connected in a series circuit, which is provided by connectors arranged at both end faces of the stator core,
wherein each path comprises L/2 groups of shaped conductors successively connected in series, wherein each group is formed by at least one arrangement of at least four shaped conductors which are arranged alternately in two immediately adjacent layers and are connected in series by first connectors which each provide an offset by q·N slots in the circumferential direction and an offset by one layer in the radial direction,
wherein pairs of groups adjacent with respect to the series connection are each connected by a second connector which provides an offset by a plurality of slots in the circumferential direction and an offset by two layers in the radial direction.

2. The stator as claimed in claim 1, wherein q≥2 and each winding zone has a first to q-th partial winding zone, wherein—each partial winding zone extends over the L layers, wherein—the partial winding zones of each winding zone are immediately adjacent in the circumferential direction.

3. The stator as claimed in claim 2, wherein each partial winding zone extends over exactly one slot.

4. The stator as claimed in claim 3, wherein the second connectors connecting groups of a respective path provide the same offset by a plurality of slots.

5. The stator as claimed in claim 3, wherein second connectors of at least one of the paths provide an offset by N·q−1 slots and/or second connectors of at least one of the paths provide an offset by N·q+1 slots.

6. The stator as claimed in claim 2, wherein each partial winding zone extends over at least two directly adjacent slots and has, in the radial direction, a number V of offsets by one slot each, wherein V≥1.

7. The stator as claimed in claim 6, wherein the offsets have the same orientation in the circumferential direction and/or occur after L/[V+1] layers.

8. The stator as claimed in claim 6, wherein second connectors of at least one of the paths provide an offset by N·q−1 slots and/or N·q−1 slots when they do not cover an offset in the radial direction.

9. The stator as claimed in claim 6, wherein second connectors at least one of the paths provide an offset by N·q−2 slots and/or N·q slots or N·q+2 slots and/or N·q slots when they cover an offset in the radial direction.

10. The stator as claimed in claim 2, wherein each group comprises q arrangements each located in a different one of the partial winding zones, wherein with respect to the series connection, directly adjacent arrangements of a group are connected by a third connector which in the circumferential direction provides an offset by a number not equal to N·q of slots and in the radial direction provides an offset by a layer.

11. The stator as claimed in claim 10, wherein the third connectors of each path provide the same offset in the circumferential direction.

12. The stator as claimed in claim 10, wherein third connectors of at least one of the paths provide an offset by N·q+1 slots and/or third connectors of at least one of the paths (7b, 7d) provide an offset by N·q−1 slots.

13. The stator as claimed in claim 10, wherein third connectors of different paths, which third connectors connect shaped conductors in the same layers (6a-g) between the same winding zones, are arranged in such a way that a third connector, which provides a smaller offset by the plurality of slots than another third connector, is arranged axially further inward than the other third connector.

14. The stator as claimed in claim 1, wherein second connectors of different paths, which second connectors connect shaped conductors in the same layers between the same winding zones, are arranged in such a way that a second connector, which provides a smaller offset by the plurality of slots than another second connector, is arranged axially further inward than the other second connector.

15. The stator as claimed in claim 1, wherein q equal amounts of paths each have, with respect to the series connection, the same sequence of connectors, each offset from one another by N·q slots.

16. The stator as claimed in claim 1, wherein the connectors arranged at one of the end faces of the stator core are each formed in one piece with the shaped conductors connected by them and the connectors arranged at the other end face of the stator core are formed by the joining in an integrally bonded manner, of free ends of connecting elements which are formed in one piece with the shaped conductor and adjoin the shaped conductor.

17. The stator as claimed in claim 1, wherein each outer shaped conductor of a path, with respect to the series connection, has a free end projecting at one of the end faces of the stator core, and a connecting element adjoins the shaped conductor at the other end face, the free end of which connecting element is provided with the or a connecting element adjoining the second-outer shaped conductor of the path.

18. The stator as claimed in claim 1, wherein the paths of each phase are connected to one or more star points of the phases.

19. An electric machine comprising a stator as claimed in claim 1 and a rotor arranged rotatable within the stator.

\* \* \* \* \*